United States Patent
Zhang et al.

(10) Patent No.: US 12,368,475 B2
(45) Date of Patent: Jul. 22, 2025

(54) PARAMETER INFORMATION DETERMINATION METHOD, COMMUNICATION NODE, AND STORAGE MEDIUM

(71) Applicant: ZTE CORPORATION, Shenzhen (CN)

(72) Inventors: Shujuan Zhang, Shenzhen (CN); Zhaohua Lu, Shenzhen (CN); Chuangxin Jiang, Shenzhen (CN); Bo Gao, Shenzhen (CN); Hao Wu, Shenzhen (CN); Zhen He, Shenzhen (CN); Ke Yao, Shenzhen (CN); Shijia Shao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 337 days.

(21) Appl. No.: 17/793,621

(22) PCT Filed: Jan. 18, 2021

(86) PCT No.: PCT/CN2021/072406
§ 371 (c)(1),
(2) Date: Jul. 18, 2022

(87) PCT Pub. No.: WO2021/143897
PCT Pub. Date: Jul. 22, 2021

(65) Prior Publication Data
US 2023/0091578 A1    Mar. 23, 2023

(30) Foreign Application Priority Data

Jan. 17, 2020   (CN) ......................... 202010055584.8

(51) Int. Cl.
H04B 7/0456    (2017.01)
H04B 7/06      (2006.01)
(Continued)

(52) U.S. Cl.
CPC ......... H04B 7/0456 (2013.01); H04B 7/0617 (2013.01); H04L 5/0051 (2013.01);
(Continued)

(58) Field of Classification Search
CPC .. H04B 7/0456; H04B 7/0617; H04B 7/0695; H04L 5/0051; H04L 5/0053;
(Continued)

(56) References Cited

U.S. PATENT DOCUMENTS

2019/0141692 A1   5/2019 Subramanian et al.
2019/0222289 A1*  7/2019 John Wilson ........ H04B 7/0626
(Continued)

FOREIGN PATENT DOCUMENTS

CN   108199819 A   6/2018
CN   110535609 A   12/2019
(Continued)

OTHER PUBLICATIONS

3GPP TSG-RAN WG1 NR Ad Hoc #3; R1-1716345; Source: Ericsson; Title: Multi-TRP and multi-panel transmission; Nagoya, Japan, Sep. 18-21, 2017; See §3.2. (Year: 2017).*
(Continued)

*Primary Examiner* — Mohammed S Chowdhury
(74) *Attorney, Agent, or Firm* — Morgan, Lewis & Bockius LLP

(57) ABSTRACT

Provided are a parameter information determination method, a communication node, and a storage medium. The parameter information determination method includes the following. A first parameter of a first type element is acquired according to a second parameter of a second type element, where the number of first parameters of the first type element is N, the number of second parameters of the second type element is M, and M and N are each a positive integer
(Continued)

greater than or equal to 1. The element includes one of: a channel, a signal, or one item in a mapping table.

20 Claims, 6 Drawing Sheets

(51) Int. Cl.
    *H04L 5/00*     (2006.01)
    *H04W 72/044*     (2023.01)

(52) U.S. Cl.
    CPC .......... *H04L 5/0053* (2013.01); *H04L 5/0094* (2013.01); *H04W 72/046* (2013.01)

(58) Field of Classification Search
    CPC ... H04L 5/0094; H04L 5/0007; H04L 5/0058; H04L 5/0023; H04L 5/0057; H04W 72/046; H04W 16/28
    See application file for complete search history.

(56) References Cited

U.S. PATENT DOCUMENTS

| | | | |
|---|---|---|---|
| 2019/0253220 A1 | 8/2019 | Kim | |
| 2019/0260532 A1* | 8/2019 | Manolakos | H04L 5/0051 |
| 2019/0297603 A1 | 9/2019 | Guo et al. | |
| 2021/0274487 A1* | 9/2021 | Matsumura | H04B 7/088 |
| 2022/0287054 A1* | 9/2022 | Kim | H04L 5/0064 |
| 2024/0121623 A1* | 4/2024 | Matsumura | H04W 72/1273 |
| 2024/0121851 A1* | 4/2024 | Matsumura | H04B 17/309 |

FOREIGN PATENT DOCUMENTS

| | | |
|---|---|---|
| CN | 110536431 A | 12/2019 |
| CN | 111901808 A | 11/2020 |
| WO | WO-2019/099659 A1 | 5/2019 |
| WO | WO-2019161807 A1 | 8/2019 |
| WO | WO-2019233352 A1 | 12/2019 |
| WO | WO-2020012662 A1 | 1/2020 |

OTHER PUBLICATIONS

3GPP TSG RAN WG1 Meeting #91; R1-1721696; Source: Qualcomm; Title: Summary of Beam Mgmt. ; Reno, USA, Nov. 27-Dec. 1, 2017. See §2.1, §2.2, §2.3, §2.5, §2.6, (Year: 2017).*
International Search Report for Application No. PCT/CN2021/072406, dated Apr. 21, 2021, 4 pages including English translation.
Japanese Office Action for Application No. 2022-574830, dated Aug. 18, 2023, 4 pages including English translation.
Qualcomm Incorporated, "Beam management for NR", 3GPP TSG-RAN WG1 Meeting 93, R1-1807341, Busan, Korea, May 21-May 25, 2018, 11 pages.
First Search Report for Chinese Application No. 202010055848, dated Jul. 3, 2024, 5 pages.
First Office Action for Chinese Application No. 20201005584.8, dated Jul. 8, 2024, 10 pages.
Extended European Search Report for Application No. 21740668.5, dated Jan. 30, 2024, 9 pages.

* cited by examiner

Acquire a first parameter of a first type element according to a second parameter of a second type element, where the number of first parameters of the first type element is N, the number of second parameters of the second type element is M, and M and N are each a positive integer greater than or equal to 1 ∼S1010
FIG. 1
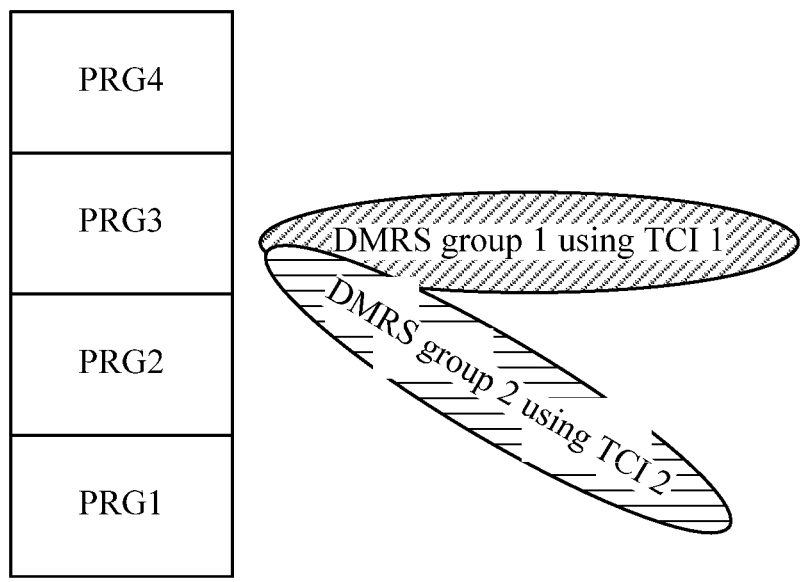
FIG. 2
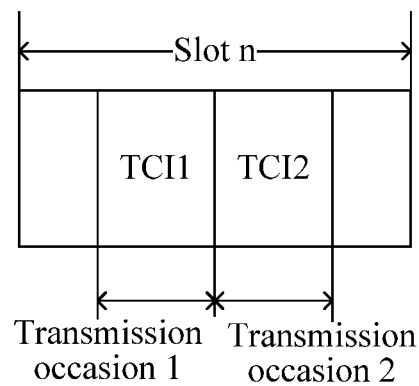
FIG. 3

PARAMETER INFORMATION DETERMINATION METHOD, COMMUNICATION NODE, AND STORAGE MEDIUM

CROSS-REFERENCE TO RELATED APPLICATIONS

This is a National Stage Application filed under 35 U.S.C. 371 based on International Patent Application No. PCT/CN2021/072406, filed on Jan. 18, 2021, which claims priority to Chinese Patent Application No. 202010055584.8 filed on Jan. 17, 2020, disclosures of both of which are incorporated herein by reference in their entireties.

TECHNICAL FIELD

The present application relates to the field of wireless communication networks, for example, a parameter information determination method, a communication node, and a storage medium.

BACKGROUND

A characteristic of beam communication is that both the receiver and transmitter of wireless signals need to perform beam training and beam updating in real-time. However, real-time beam updating consumes large amounts of signaling information. In addition, to ensure the reliability of the beam updating, the beam updating may not be dynamically achieved through physical signaling, but be notified according to higher-layer signaling. As a result, the speed of the beam updating is also a problem.

SUMMARY

The present application provides a parameter information determination method, a communication node, and a storage medium, so as to reduce the signaling overhead during beam updating and reduce the beam switching delay.

Embodiments of the present application provide a parameter information determination method. The method includes the following.

A first parameter of a first type element is acquired according to a second parameter of a second type element, where the number of first parameters of the first type element is N, the number of second parameters of the second type element is M, and M and N are each a positive integer greater than or equal to 1. The element includes one of: a channel, a signal, or one item in a mapping table.

The embodiments of the present application further provide a communication node including a processor and a memory, where the processor is configured to execute program instructions stored in the memory to perform the preceding parameter information determination method.

The embodiments of the present application further provide a computer-readable storage medium. A program, when performed by a processor, implements the preceding parameter information determination method.

BRIEF DESCRIPTION OF DRAWINGS

FIG. 1 is a flowchart of a parameter information determination method according to an embodiment;

FIG. 2 is a diagram of two first parameter TCI states corresponding to two DMRS port groups;

FIG. 3 is a diagram of two repeated transmissions in a slot corresponding to different TCIs;

DETAILED DESCRIPTION

Figure 4:
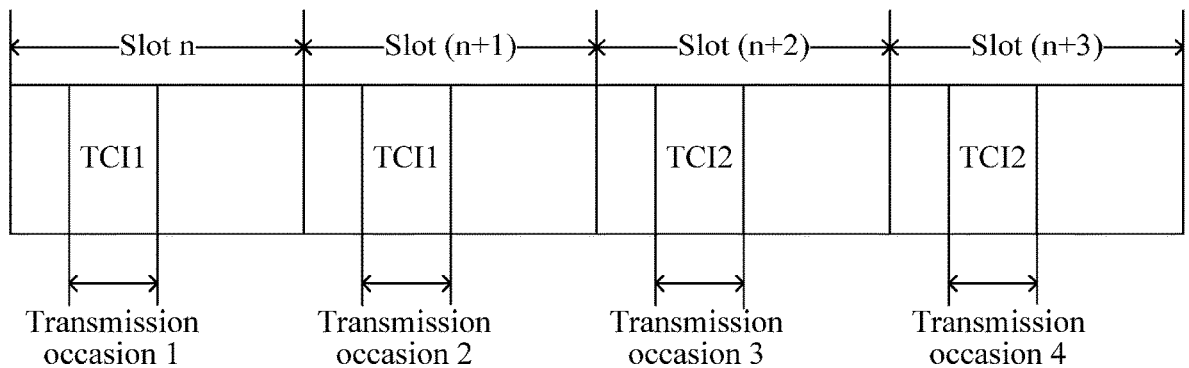
FIG. 4 is a diagram of mapping relationships between four repeated transmissions in four slots and two TCIs.

Embodiments of the present application are described below in conjunction with drawings.

To reduce the signaling overhead during beam updating and improve the speed of the beam updating, the embodiments of the present application provide a parameter information determination method. In the method, a first parameter of a first type element is acquired according to a second parameter of a second type element, so that the first parameter and the second parameter share one piece of notification signaling or one determination method, and the first parameter is updated after the second parameter is updated. In this manner, the signaling overhead and the beam switching delay can be reduced. Moreover, the present application considers how to acquire beam information of the first type element in a multibeam scene. Through the method of the present application, the multiple beam transmission is supported while the signaling overhead and the beam switching delay are reduced, so that the robustness or the spectral efficiency of links is improved.

In the embodiment of the present application, acquiring information 1 according to information 2 includes one of manners described below. A parameter for acquiring information 1 includes information 2; information 1 is information 2. Information 1 and information 2 each may be a first parameter, a second parameter, a third parameter, or a fourth parameter.

In the embodiment of the present application, a frequency domain bandwidth includes one of: a serving cell, a bandwidth part (BWP), or a Physical Resource Block (PRB) set.

In the embodiment of the present application, a channel includes at least one of: a control channel, a data channel, or a random access channel, etc. A signal includes at least one of: a sounding reference signal, a synchronization signal, a random access signal, a phase tracking signal, or a demodulation reference signal (DMRS), etc.

In the embodiment of the present application, higher-layer signaling includes signaling other than downlink control information (DCI) of physical layer signaling. For example, the higher-layer signaling includes one or more of radio resource control (RRC) signaling and medium access control-control element (MAC-CE) signaling.

FIG. 1 is a flowchart of a parameter information determination method according to an embodiment. As shown in FIG. 1, the method provided in the embodiment includes the following.

In S1010, a first parameter of a first type element is acquired according to a second parameter of a second type element, where the number of first parameters of the first type element is N, the number of second parameters of the second type element is M, and M and N are each a positive integer greater than or equal to 1.

The parameter information determination method provided in the embodiment is applied to a communication node such as a terminal or a base station in a mobile communication network. The first type element and the second type element in the embodiment of the present application are any kind of information sent or received by the mobile communication network. For example, the first type element and the second type element include one of a channel, a signal, or one item in a mapping table. The first type element and the second type element separately include multiple parameters, where the number of first parameters of the first type element is N, and the number of second parameters of the second type element is M. M and N are each a positive integer greater than or equal to 1. The one item in the mapping table represents a codepoint in the mapping table.

In an embodiment, acquiring the first parameter of the first type element according to the second parameter of the second type element includes one of the following. A first parameter having an index of i of the first type element is acquired according to a second parameter having an index of i of the second type element, where i∈{0, 1, . . . , M−1}; or a second parameter, among M second parameters of the second type element, corresponding to each first parameter among N first parameters is determined, where the each first parameter is acquired according to a second parameter having a corresponding relationship with the each first parameter. An index of the each first parameter among the N first parameters of the first type element in the N first parameters is acquired according to the following information: a fourth parameter of the first type element corresponding to the each first parameter. An index of each second parameter among the M second parameters of the second type element in the M second parameters is acquired according to one of the following pieces of information: a fourth parameter of the second type element corresponding to the each second parameter; a sequencing order of the M second parameters in signaling notifying the M second parameters; or group information of the second type element.

In an embodiment, acquiring the first parameter of the first type element according to the second parameter of the second type element includes the following. The first parameter of the first type element is acquired according to second parameters of more than one second type element. The more than one second type element includes second type elements in more than one second type element group; the more than one second type element belongs to the same second element group; in a case where the second type element includes the one item in the mapping table, the more than one second type element includes multiple items in multiple mapping tables; or in a case where the second type element includes the one item in the mapping table, the more than one second type element includes multiple items in the mapping table. The method further includes one of the following. It is obtained through signaling information or a predetermined rule that the more than one second type element belongs to one group or belongs to multiple groups; or it is obtained through signaling information or a predetermined rule that the more than one second type element corresponds to one mapping table or corresponds to multiple mapping tables. Each first parameter among N first parameters of the first type element is acquired according to a second parameter having a corresponding relationship with the each first parameter, where corresponding relationships between the N first parameters of the first type element and second parameters of multiple second type elements are determined according to at least one of the following pieces of information: an index of the second type element, an index of a second type element group, the number of second parameters of one second type element, or an index of each second parameter among M second parameters of one second type element in the M second parameters. The number N of first parameters of one first type element is greater than the number M of second parameters of one second type element.

In an embodiment, acquiring the first parameter of the first type element according to the second parameter of the second type element includes the following. In a case where N is greater than M, M first parameters of the first type element are acquired according to M second parameters of the second type element, and remaining (N−M) first parameters are acquired according to a third parameter; where the third parameter is acquired according to signaling information or a predetermined rule. The third parameter satisfies one of the following characteristics: the third parameter having no corresponding relationship with the second type element; or the third parameter corresponding to a third type element, where the third type element and the second type element are different elements, or the third type element and the second type element are elements of different types.

In an embodiment, N is less than or equal to $M_{min}$, where $M_{min}$ includes one of: the minimum number of second parameters of one second type element; the minimum value of total numbers of different second parameters in a set composed of second parameters of all second type elements within a time period; or the minimum value of total numbers of different second parameters in a set composed of second parameters of all second type elements in a frequency domain bandwidth within a time period; N is less than or equal to $M_{max}$, where $M_{max}$ includes one of: the maximum number of second parameters of one second type element; the maximum value of total numbers of different second parameters in a set composed of second parameters of all second type elements within a time period; or the maximum value of total numbers of different second parameters in a set composed of second parameters of all second type elements in a frequency domain bandwidth within a time period; or N is less than or equal to M.

In an embodiment, acquiring the first parameter of the first type element according to the second parameter of the second type element includes the following. In a case where N is greater than M, first M first parameters of the first type element are acquired according to M second parameters of the second type element, and remaining last (N−M) first parameters of the first type element are acquired according to a predetermined item second parameter among the M second parameters of the second type element.

In an embodiment, acquiring the first parameter of the first type element according to the second parameter of the second type element includes the following. A fourth parameter of the first type element is determined according to one of manners described below. In a case where N is greater than M, N fourth parameters of the first type element are re-divided into M fourth parameters; or division of fourth parameters corresponding to the first type element is determined according to the value of M; where each fourth parameter corresponds to one first parameter, and the fourth parameter includes at least one of: a DMRS port group, a time domain resource group, a frequency domain resource group, or one transmission occasion of the element.

In an embodiment, acquiring the first parameter of the first type element according to the second parameter of the second type element includes the following. In a case where N is less than or equal to M, the first parameter of the first type element is acquired according to the second parameter of the second type element; or in a case where N is greater than M, the first parameter of the first type element is acquired according to a third parameter of a third type element.

In an embodiment, the value of N is acquired according to at least one of the following pieces of information: information notified in Downlink Control Information scheduling the first type element; the value of M; the maximum value of numbers of second parameters of multiple second type elements; or the minimum value of numbers of second parameters of multiple second type elements.

In an embodiment, the mapping table includes mapping relationships between bit field values in physical downlink control information and indicated contents. The mapping table includes at least one of: a mapping relationship between an indicator field of a transmission configuration indication (TCI) in DCI and a TCI state in a physical downlink shared channel (PDSCH); or a mapping table between an indicator field of a SRS resource indicator (SRI) in DCI and an SRI in a physical uplink shared channel (PUSCH).

In an embodiment, the second type element satisfies the condition described below. The second type element includes an element satisfying a predetermined characteristic among elements whose number M of second parameters is greater than or equal to N.

For example, when N is equal to M, N first parameters of the first type element are acquired according to M second parameters of the second type element. If, at this time, N and M are greater than 1, it is required to specify corresponding relationships between the N first parameters and the M second parameters, so that the first parameter having an index of i is acquired according to the second parameter corresponding to the first parameter having an index of i.

When N is not equal to M, the method for acquiring the first parameter of the first type element needs to be determined, and one or more solutions described below may be used for acquisition.

In solution 1, the receiver and the transmitter (for example, a terminal and a base station) predetermine that when the first parameter of the first type element is acquired according to the second parameter of the second type element and N is less than or equal to M, a first parameter having an index of i of the first type element is acquired according to a second parameter having an index of i of the second type element, where i=0, 1, . . . , or M−1, or i∈{0, 1, . . . , M−1}. Alternatively, corresponding relationships between the N first parameters of the first type element and the M second parameters of the second type element are established through signaling information or a predetermined rule, and the first parameter having an index of i is acquired according to the second parameter having a corresponding relationship with the first parameter having the index of i.

In solution 2, when N is greater than M, the first parameter of the first type element is acquired according to second parameters of more than one second type element. For example, the first parameter of the first type element is acquired according to second parameters of ⌈N/M⌉ second type elements. ⌈N/M⌉ represents rounding up N/M. Optionally, for the second parameters of the ⌈N/M⌉ second type elements, indexes of the second type elements are kept unchanged, the index of the first parameter increases, then the indexes of the second type element increase, and ⌈N/M⌉*M second parameters are obtained; then a first parameter having an index of j of the first type element is obtained according to a second parameter having an index of j, where j=0, 1, . . . , or N−1. Alternatively, a corresponding relationship between the first parameter and the second parameter is established, and thus the first parameter having an index of j is acquired according to the second parameter having a corresponding relationship with the first parameter having the index of j. In the preceding description, it is assumed that the number of second parameters of each second type element among multiple second type elements is M, and the embodiment does not exclude a case where various second type elements have different numbers of second parameters. For example, N=2 and M=1, and two second parameters of the first type element are obtained according to second parameters of two second type elements. The first parameter having an index of p of the first type element is obtained according to the second parameter having an index of p of the second type element, where p=1 or 2. Alternatively, N=4 and M=2, and four second parameters of the first type element are obtained according to second parameters of two second type elements. Indexes of the four second parameters are obtained in the order of a second parameter having an index of 0 of a second type element having an index of 0, a second parameter having an index of 1 of the second type element having the index of 0, a second parameter having an index of 0 of a second type element having an index of 1, and a second parameter having an index of 1 of the second type element having the index of 1, and then a first parameter having an index of j is acquired according to a second parameter having an index of j, where j=0, 1, 2, or 3.

Optionally, more than one second type element includes second type elements in more than one group. Alternatively, the more than one second type element belongs to the same second element group.

Optionally, it may be obtained through signal information or a predetermined rule that whether the more than one second type element includes the second type elements in the more than one group or the more than one second type element belongs to the same second element group.

Optionally, the second type element group is acquired in one of manners described below. Second type elements included in the second type element group are notified through signaling information; second type elements in one second type element group are associated with the same group information; a time domain resource and/or a frequency domain resource which are occupied by second type elements in one second type element group satisfy a predetermined characteristic; or, group information of the second type element is determined according to group information of a control channel scheduling the second type element. For example, second type elements falling in a time unit compose a group, and second type elements falling in the same frequency domain resource group compose a group.

In solution 3, when N is greater than M, M second parameters of the first type element are acquired according to M second parameters of the second type element, and remaining (N−M) second parameters of the first type element are obtained according to a third parameter, where the third parameter is obtained according to signaling information or a predetermined rule.

Optionally, the third parameter has no corresponding relationship with the second type element; or the third parameter corresponds to a third type element, where the third type element and the second type element are different elements, or the third type element and the second type element are elements of different types. For example, the second type element is a control channel, and the third type element is a data channel.

In solution 4, when N is less than M, N first parameters of the first type element are acquired according to N second parameters among M second parameters of the second type element according to signaling information and/or a predetermined rule. For example, the N first parameters of the first type element are acquired according to first N second parameters of the second type element. For example, a first parameter having an index of j is acquired according to a second parameter having an index of j, where j=0, 1, . . . , or N−1.

In solution 5, a terminal and a base station agree that when the first parameter of the first type element is acquired according to the second parameter of the second type element, N is less than or equal to $M_{min}$. $M_{min}$ includes one of: the minimum number of second parameters of one second type element; the minimum value of total numbers of different second parameters in a set composed of second parameters of all second type elements within a time period; or the minimum value of total numbers of different second parameters in a set composed of second parameters of all second type elements in a frequency domain bandwidth within a time period.

In solution 6, a terminal and a base station agree that when the first parameter of the first type element is acquired according to the second parameter of the second type element, N is less than or equal to $M_{max}$. $M_{max}$ includes one of: the maximum number of second parameters of one second type element; the maximum value of total numbers of different second parameters in a set composed of second parameters of all second type elements within a time period; or the maximum value of total numbers of different second parameters in a set composed of second parameters of all second type elements in a frequency domain bandwidth within a time period.

In solution 7, when N is greater than M, M first parameters of the first type element are acquired according to M second parameters of the second type element, and remaining (N−M) first parameters of the first type element are acquired according to a second parameter satisfying a predetermined characteristic among the M second parameters. For example, the remaining (N−M) first parameters of the first type element are acquired according to a second parameter having the largest index among the M second parameters. Alternatively, the remaining (N−M) first parameters of the first type element are acquired according to the second parameter having the smallest index among the M second parameters. That is, fourth parameters corresponding to the (N−M) first parameters are combined into one fourth parameter, and the first parameter corresponding to the combined fourth parameter is acquired according to a second parameter having the largest index (or the smallest index) among the M second parameters. At this time, it may also be referred to as that N is acquired according to M.

In solution 8, when N is greater than M, N first parameters of the first type element are re-divided to form M fourth parameters, and then the N first parameters corresponding to the M fourth parameters of the first type element are acquired according to M second parameters of the second type element. At this time, it may also be referred to as that N is acquired according to M.

In solution 9, when N is less than or equal to M, the first parameter of the first type element is acquired according to the second parameter of the second type element; when N is greater than M, the first parameter of the first type element is acquired according to a third parameter of a third type element.

In the preceding solutions, N is notified in signaling information configuring or scheduling the first type element. In the preceding solutions 1, 5, 6, 7, and 8, it may also be referred to as that N is acquired according to M; at this time, it is not necessary to configure the value of N in the signaling information configuring or scheduling the first type element.

Optionally, N first parameters of the first type element correspond to N fourth parameters of the first type element. The fourth parameters include at least one of: a demodulation reference signal (DMRS) port group, a time domain resource group, a frequency domain resource group, or a transmission occasion of the first type element. For example, N first parameters correspond to N DMRS port groups, each DMRS port group corresponds to one first parameter, and channels corresponding to the N DMRS port groups occupy the same time-frequency resource. As shown in FIG. 2, FIG. 2 is a diagram of two first parameter TCI states corresponding to two DMRS port groups. In FIG. 2, multiple precoding resource block groups (PRGs) obtain two first parameters, that is, TCI1 and TCI2. TCI refers to a transmission configuration indication, and two first parameters correspond to two DMRS port groups.

Alternatively, N first parameters correspond to N resource groups, and each resource group corresponds to one first parameter. Resources included in a resource group corresponding to one first parameter may be continuous resources or discontinuous resources, and the N resource groups correspond to at least N times of repeated transmission of the first type element, that is, one resource group may include one or more times of repeated transmission of the first type element, or multiple resource groups include one transmission occasion of the first type element, where the resource includes one or more of a time domain resources and a frequency domain resource. For example, the resource group is a time domain resource group. As shown in FIG. 3 and FIG. 4, FIG. 3 is a diagram of two repeated transmissions in a slot corresponding to different TCIs; FIG. 4 is a diagram of mapping relationships between four repeated transmissions in four slots and two TCIs. In FIG. 3, two first parameter TCI states (that is, TCIs in the figure) correspond to two time domain resource groups in one slot, and in FIG. 4, two first parameter TCI states correspond to two time domain resource groups in four slots. The time domain resource group corresponding to TCI state1 (that is, TCI1 in FIG. 4) is {transmission occasion 1, transmission occasion 2}, and the time domain resource group corresponding to TCI state2 (that is, TCI2 in FIG. 4) is {transmission occasion 3, transmission occasion 4}, where a channel is repeatedly transmitted in multiple transmission occasions.

Figure 5:
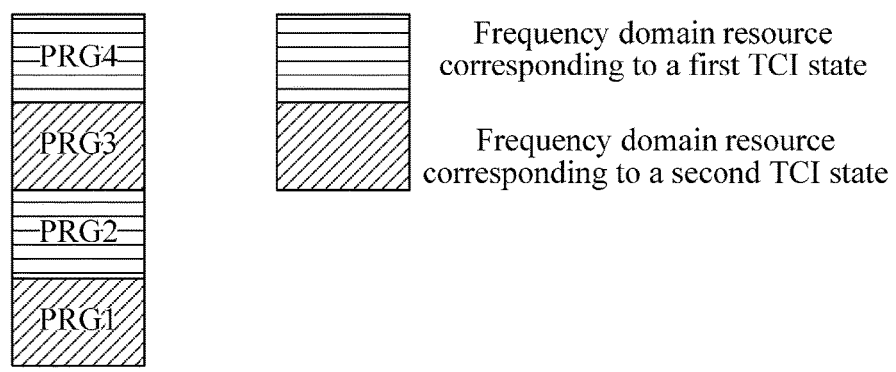
FIG. 5 is a diagram of two frequency domain resources corresponding to two TCIs.

For example, the resource group is a frequency domain resource group. FIG. 5 is a diagram of two frequency domain resources corresponding to two TCIs. Two TCI states correspond to two frequency domain resource groups. As shown in FIG. 5, the frequency domain resource group corresponding to TCI state1 (that is, a first TCI state in FIG. 5) is {PRG1, PRG3}, and the frequency domain resource group corresponding to TCI state2 (that is, a second TCI state in FIG. 5) is {PRG2, PRG4}, where a PRG is a Precoding Resource block Group, channels in the same PRG have the same precoding, and channels in different PRGs have the same or different precoding.

The embodiment of the present application also does not exclude that one second parameter corresponds to more than one first parameter. For example, one DMRS port group in FIG. 2 corresponds to two TCI states, and at this time, two DMRS port groups in FIG. 2 correspond to four TCI states; or, each time domain resource in one time domain resource group in FIG. 3 to FIG. 4 corresponds to two TCI states, thus resulting in two time domain resource groups in FIG. 3 to FIG. 4 corresponding to four TCI states in total; or each frequency domain resource in one frequency domain resource group in FIG. 5 corresponds to two TCI states, resulting in two frequency domain resource groups in FIG. 5 corresponding to four TCI states in total. In the preceding description of FIG. 4, the time domain resource corresponding to {transmission occasion 1, transmission occasion 2} is referred to as a time domain resource group, and if the preceding fourth parameter is a transmission occasion, transmission occasion 1 and transmission occasion 2 correspond to two time domain resource groups. Therefore, at this time, N first parameters of the first type element correspond to at least N fourth parameters of the first type element, each first parameter corresponds to one or more fourth parameters, and each fourth parameter corresponds to one or more first parameters.

Similarly, M second parameters of the second type element correspond to M fourth parameters of the second type element. For example, M second parameters correspond to M DMRS port groups, and each DMRS port group corresponds to one second parameter. Alternatively, M second parameters correspond to M resource groups, and each resource group corresponds to one second parameter. Resources included in a resource group corresponding to one second parameter may be continuous resources or discontinuous resources, and the M resource groups correspond to at least M times of repeated transmission of the second type element, that is, one resource group may include one or more times of repeated transmission of the second type element, or M frequency domain resource groups correspond to one time of repeated transmission of the second type element, where the resource includes one or more of a time domain resource and a frequency domain resource. The embodiment also does not exclude that one fourth parameter corresponds to more than one second parameter, and one second parameter corresponds to one or more fourth parameters.

Optionally, an index of each first parameter among N first parameters of the first type element in the N first parameters is acquired according to N fourth parameters corresponding to the first type element. For example, N first parameters correspond to N time domain resource groups, and then the index of each first parameter among the N first parameters in the N first parameters is acquired according to an index of a time domain resource group corresponding to the each first parameter in the N time domain resource groups. For example, an index of a first parameter corresponding to a j-th time domain resource group is j, where j=0, 1, . . . , or N−1. Optionally, an index of a time domain resource group among the N time domain resource groups may be obtained according to a time domain position order of starting time domain symbols included in the N time domain resource groups; and the later the starting position of the time domain resource group, the larger the index of the time domain resource group.

Similarly, an index of each second parameter among M second parameters of the second type element in the M second parameters is obtained according to one of manners described below. The index of the each second parameter may be obtained according to an order of second parameters in signaling notifying the second parameters; or the index of the each second parameter may be obtained according to indexes of M fourth parameters of the second type element corresponding to the second type element. For example, M second parameters correspond to M frequency domain resource groups, and then an index of each second parameter among the M second parameters in the M second parameters is acquired according to an index of a frequency domain resource group corresponding to the each second parameter in the M frequency domain resource groups. For example, an index of a second parameter corresponding to a j-th frequency domain resource group is j, where j=0, 1, . . . , or M−1. Optionally, an index of a frequency domain resource group among the M frequency domain resource groups may be obtained according to a starting frequency domain resource position order included in the M frequency domain resource groups; and the larger the starting frequency domain position of the frequency domain resource group, the larger the index of the frequency domain resource group. Alternatively, an index of each second parameter among M second parameters of the second type element in the M second parameters is obtained according to an order of M second parameters in signaling notifying the second parameters. For example, the second parameters include M second parameters corresponding to one mapping relationship in a TCI state mapping table, and an index of each second parameter is obtained according to the order of the M second parameters in the one mapping relationship. For example, the index at the first position is 0, and the index at the second position is 1.

The preceding description refers to that a corresponding relationship exists between an a-th parameter and a fourth parameter, where the a-th parameter includes the preceding first parameter and/or the preceding second parameter, that is, a includes one and/or two. The embodiment of the present application does not exclude that the first parameter and/or the second parameter include a fourth parameter, for example, a DMRS port group parameter (that is, the first parameter, where the DMRS port group parameter includes at least one of: a division parameter of DMRS port groups or a number parameter of DMRS port groups) of the first type element is acquired according to a DMRS port group parameter (that is, the second parameter) of the second type element, where the number of DMRS port groups of the first type element is N, and the number of DMRS port groups of the second type element is M. Alternatively, a frequency domain resource group parameter (that is, the first parameter) of the first type element is acquired according to a DMRS port group parameter (that is, the second parameter) of the second type element, where the number of frequency domain resource groups of the first type element is N, and the number of DMRS port groups of the second type element is M. Alternatively, the number of repeated transmission times of the first type element is determined according to the number of repeated transmission times of the second type element.

Optionally, in a case where the a-th type element includes a downlink element, an a-th parameter includes at least one of: a quasi co-location parameter, a transmission mode, a demodulation reference signal (DMRS) port group, a time domain resource group, a frequency domain resource group, or a transmission occasion of the downlink element. The quasi co-location parameter includes one of: a quasi co-location reference signal, a quasi co-location hypothesis, or a TCI. The quasi co-location hypothesis includes a hypothesis related to at least one of: Doppler shift, Doppler spread, an average delay, delay spread, average gain, a spatial receiving (Rx) parameter, or another channel characteristic parameter. a includes one and/or two, that is, the a-th parameter includes one or more of the first parameter and the second parameter. Optionally, DMRS ports in one downlink DMRS port group satisfy a quasi co-location relationship, and DMRS ports in different DMRS port groups do not satisfy the quasi co-location relationship; or, on the same time-frequency resource, DMRS ports in one DMRS port group satisfy a quasi co-location relationship, DMRSs in different DMRS port groups do not satisfy the quasi co-location relationship, and on different time-frequency resources, DMRS ports in the same DMRS port group may not satisfy the quasi co-location relationship. For example, the same DMRS port group in different PRB sets (and/or different time domain resource groups) may correspond to different TCI states. The downlink element includes one of: a downlink channel, a downlink signal, or one item in a TCI state mapping table of a PDSCH. The TCI state mapping table of the Physical Downlink Shared Channel (PDSCH) is shown as Table 1.

TABLE 1

| TCI codepoint value | TCI state |
| --- | --- |
| 000 | TCI state1 |
| 001 | TCI state 2, TCI state8 |
| 010 | TCI state 4, TCI state19 |
| 011 | TCI state 3 |
| 100 | TCI state 4 |
| 101 | TCI state 8 |
| 110 | TCI state 11 |
| 111 | TCI state 63 |

TCI states of the PDSCH are obtained by scheduling values of codepoints indicated in a TCI indicator field in a Physical Downlink Control Channel (PDCCH) of the PDSCH with reference to Table 1.

Optionally, in a case where an a-th type element includes an uplink element, an a-th parameter includes at least one of the following parameters: a spatial parameter, a power parameter, a transmission mode, a DMRS port group, a time domain resource group, a frequency domain resource group, or a transmission occasion of the uplink element, where the spatial parameter includes one of: spatial relationship information or a spatial transmitting filter parameter. Spatial relationship information of one uplink element includes an uplink reference signal or a downlink reference signal. When the spatial relationship information includes an uplink reference signal (including a random access signal), a spatial transmitting filter of the uplink element is acquired according to a spatial transmitting filter of the uplink reference signal in the spatial relationship information; when the spatial relationship information includes a downlink reference signal (including a synchronization signal), a spatial transmitting filter of the uplink element is acquired according to a spatial reception filter of the downlink reference signal in the spatial relationship information. a includes one and/or two, that is, the a-th parameter includes one or more of the first parameter and the second parameter. Optionally, at this time, DMRS ports in a DMRS port group of an uplink channel correspond to the same spatial parameter, and DMRS ports in different DMRS port groups correspond to different spatial parameters; or, on the same time-frequency resource, DMRS ports in a DMRS port group correspond to the same spatial parameter, and DMRS ports in different DMRS port groups correspond to different spatial parameters. On different time-frequency resources, the same DMRS port group may not correspond to the same spatial parameter. The uplink element includes one of: an uplink channel, an uplink signal, or one item in a sounding reference signal (SRS) resource indicator (SRI) mapping table of an uplink PUSCH. The SRI mapping table of the PUSCH is shown as Table 2.

TABLE 2

| SRI codepoint value | SRI |
| --- | --- |
| 00 | SRS 0 |
| 01 | SRS 1 |
| 10 | SRS 2 |
| 11 | SRS 3 |

Sounding reference signals (SRSs) associated with the physical uplink shared channel (PUSCH) are obtained by scheduling values of codepoints indicated in an SRI indicator field in a PDCCH of the PUSCH with reference to Table 2. Table 2 is an SRI mapping table of a one-layer PUSCH, the number of layers of the PUSCH is acquired through a DMRS port indicator field in DCI. The SRI mapping table of the PUSCH may also be a mapping table obtained by combining SRI mapping tables having all different numbers of layers, where Table 3 shows the effect of combining the mapping table having two layers and the mapping table having one layer. In Table 3, the number of layers is obtained according to a DMRS indicator field, so in the SRI mapping table, values of codepoints of SRIs having one layer overlap values of codepoints of SRIs having two layers.

TABLE 3

| SRI codepoint value | SRI |
|---|---|
| 00 | SRS 0 |
| 01 | SRS 1 |
| 10 | SRS 2 |
| 11 | SRS 3 |
| 00 | SRI0, SRI1 |
| 01 | SRI0, SRI2 |
| 10 | SRI0, SRI3 |
| 11 | SRI1, SRI2 |
| 100 | SRI1, SRI3 |
| 101 | SRI2, SRI3 |

One item of the SRI mapping table includes a row in Table 2 or Table 3, that is, a row corresponding to one codepoint.

Optionally, a power parameter of the uplink element includes at least one of the following parameters: target power p0, pathloss factor alpha, or a pathloss reference signal.

Optionally, if the preceding first type element and/or the preceding second type element are a uplink element, a transmission mode of the uplink element includes corresponding relationships between N fifth parameters of the uplink element and at least N fourth parameters of the uplink element. Each fifth parameter among the N fifth parameters of the uplink element corresponds to one or more fourth parameters, each fourth parameter among the N fourth parameters of the uplink element corresponds to one or more fifth parameters, the fifth parameter includes one or more of a spatial parameter and a power parameter, and the fourth parameter includes one or more of a DMRS port group, a time domain resource group, a frequency domain resource group or a repeated transmission occasion of the element.

Similarly, if the preceding first type element and/or the preceding second type element are a downlink element, a transmission mode of the downlink element includes corresponding relationships between N quasi co-location parameters of the downlink element and at least N fourth parameters of the downlink element. Each quasi co-location parameter among the N quasi co-location parameters of the downlink element corresponds to one or more fourth parameters, each fourth parameter of the downlink element corresponds to one or more quasi co-location parameters, and the fourth parameter includes one or more of a DMRS port group, a time domain resource group, and a frequency domain resource group, as shown in FIG. 2 to FIG. 5.

The transmission mode of the uplink element includes one or more of transmission modes described below.

In transmission mode 1a, N fifth parameters of the uplink element correspond to N DMRS port groups. Each fifth parameter among the N fifth parameters corresponds to one DMRS port group, and different DMRS port groups correspond to different fifth parameters. The N DMRS port groups correspond to one redundancy version of a transmission block, and the one redundancy version is subjected to layer mapping, frequency domain mapping, and time domain mapping successively in all DMRS ports included in the N DMRS port groups.

In transmission mode 1b, N fifth parameters of the uplink element correspond to N DMRS port groups. Each fifth parameter among the N fifth parameters corresponds to one DMRS port group, and different DMRS port groups correspond to different fifth parameters. The N DMRS port groups correspond to N redundancy versions of one transmission block, and the N redundancy versions may be the same redundancy version. In each DMRS port group among the N DMRS port groups, one redundancy version is subjected to layer mapping, frequency domain mapping, and time domain mapping successively, and the same transmission block is repeatedly transmitted in the N DMRS port groups.

In transmission mode 2a, N fifth parameters of the uplink element correspond to N frequency domain resource groups. Each fifth parameter among the N fifth parameters corresponds to one frequency domain resource group, and different frequency domain resource groups correspond to different fifth parameters. The N frequency domain resource groups correspond to one redundancy version of a transmission block, and the one redundancy version is subjected to layer mapping, frequency domain mapping, and time domain mapping successively in all frequency domain resources included in the N frequency domain resource groups.

In transmission mode 2b, N fifth parameters of the uplink element correspond to N*A frequency domain resource groups. Each fifth parameter among the N fifth parameters corresponds to A frequency domain resource groups, and different A frequency domain resource groups correspond to different fifth parameters. The N*A frequency domain resource groups correspond to at least N*A redundancy versions of a transmission block, and the N*A redundancy versions may be the same redundancy version or different redundancy versions. In each frequency domain resource group among the N*A frequency domain resource groups, one redundancy version is subjected to layer mapping, frequency domain mapping, and time domain mapping successively, that is, the same transmission block is repeatedly transmitted in the N*A frequency domain resource groups. For simplicity in the preceding description, the number of frequency domain resource groups corresponding to each fifth parameter among the N fifth parameters is A, although the embodiment does not exclude a case where different fifth parameters correspond to different numbers of frequency domain resource groups.

In transmission mode 3a, N fifth parameters of the uplink element correspond to N time domain resource groups. Each fifth parameter among the N fifth parameters corresponds to one time domain resource group, and different time domain resource groups correspond to different fifth parameters. The N time domain resource groups correspond to one redundancy version of a transmission block, and data of the one redundancy version is mapped first across layers, then across frequency domain resources included in each of the N time domain resource groups, finally across in the N time domain resources groups. The N time domain resource groups are included in one time unit, such as a slot.

In transmission mode 3b, N fifth parameters of the uplink element correspond to N*A time domain resource groups. Each fifth parameter among the N fifth parameters corresponds to A time domain resource groups, and different A time domain resource groups correspond to different fifth parameters. The N*A time domain resource groups correspond to at least N*A redundancy versions of a transmission block, and the N*A redundancy versions may be the same redundancy version or different redundancy versions. In each time domain resource group among the N*A time domain resource groups, one redundancy version is subjected to layer mapping, frequency domain mapping, and time domain mapping successively, that is, the same transmission block is repeatedly transmitted in the N*A time domain resource groups. For simplicity in the preceding description, the number of time domain resource groups corresponding to each fifth parameter among the N fifth parameters is A, although the embodiment does not exclude a case where different fifth parameters correspond to different numbers of time domain resource groups. The N*A time domain resource groups are included in one time unit, such as a slot.

In transmission mode 4a, N fifth parameters of the uplink element correspond to N time domain resource groups. Each fifth parameter among the N fifth parameters corresponds to one time domain resource group, and different time domain resource groups correspond to different fifth parameters. The N time domain resource groups correspond to one redundancy version of a transmission block, and the one redundancy version is subjected to layer mapping, frequency domain mapping, and time domain mapping successively in all frequency domain resources included in the N time domain resource groups. The N time domain resource groups are included in N time units, such as N slots, and each time unit includes one time domain resource group.

In transmission mode 4b, N fifth parameters of the uplink element correspond to N*A time domain resource groups. Each fifth parameter among the N fifth parameters corresponds to A time domain resource groups, and different A time domain resource groups correspond to different fifth parameters. The N*A time domain resource groups correspond to at least N*A redundancy versions of a transmission block, and the N*A redundancy versions may be the same redundancy version or different redundancy versions. In each time domain resource group among the N*A time domain resource groups, one redundancy version is subjected to layer mapping, frequency domain mapping, and time domain mapping successively, that is, the same transmission block is repeatedly transmitted in the N*A time domain resource groups. For simplicity in the preceding description, the number of time domain resource groups corresponding to each fifth parameter among the N fifth parameters is A, although the embodiment does not exclude a case where different fifth parameters correspond to different numbers of time domain resource groups. The N*A time domain resource groups are included in N*A time units, such as N*A slots.

The transmission mode of the uplink element may further include a combination of transmission modes of the preceding transmission modes 1a to 4a.

Similarly, in a case where the first type element or the second type element is a downlink element, a transmission mode of the downlink element may also include the preceding transmission modes 1a to 4b and a combination of transmission modes 1a to 4a, with the difference that in the description of the preceding transmission modes 1a to 4b, the uplink element is replaced with the downlink element, and the fifth parameter is replaced with the quasi co-location parameter. Optionally, when the downlink element includes a control resource set (CORESET), the transmission block is replaced with DCI included in the CORESET, or the transmission block is replaced with a DCI modulation symbol included in the CORESET.

In an embodiment, acquiring the first parameter of the first type element according to the second parameter of the second type element includes at least one of the following. A first transmission mode of the first type element is determined according to a second transmission mode of the second type element; the value of N is determined according to the value of M; the number of fourth parameters of the first type element is determined according to the number of fourth parameters of the second type element; or the number of repeated transmission times of the first type element is determined according to the number of repeated transmission times of the second type element. The fourth parameter includes one of: a DMRS port group, a time domain resource group, a frequency domain resource group, or one transmission occasion of the element.

Optionally, in the preceding various scenes, acquiring the first transmission mode of the first type element according to the second transmission mode of the second type element includes one of the following.

The value of N is acquired according to the value of M; the first transmission mode is the same as the second transmission mode; a transmission mode set to which the first transmission mode belongs is obtained according to the second transmission mode, where the transmission mode set includes one or more transmission modes; or the type of a fourth parameter corresponding to a first parameter in the first transmission mode is the same as the type of a fourth parameter corresponding to a second parameter in the second transmission mode. The second transmission mode of the second type element includes mapping relationships between M second parameters of the second type element and X fourth parameters of the second type element, where X is a positive integer, or the second transmission mode includes a repeated transmission mode of the second type element; or the first transmission mode of the first type element includes mapping relationships between N first parameters of the first type element and Y fourth parameters of the first type element, where Y is a positive integer, or the first transmission mode includes a repeated transmission mode of the first type element. For example, when the second transmission mode of the second type element is any one of transmission modes 3a to 4b, the first transmission mode cannot be any one of transmission modes 1a to 2b, and the type of the fourth parameter corresponding to the first parameter in the first transmission mode is the same as the type of the fourth parameter corresponding to the second parameter in the second transmission mode. For example, the M second parameters in the second transmission mode correspond to M time domain resource groups, and then the N first parameters in the first transmission mode correspond to N time domain resource groups. The number of fourth parameters corresponding to the first type element is obtained according to the number of fourth parameters corresponding to the second type element.

In an embodiment, acquiring the first parameter of the first type element according to the second parameter of the second type element further includes one of the following. The N first parameters of the first type element correspond to X fourth parameters, where each first parameter among the N first parameters corresponds to one or more fourth parameters, or each fourth parameter among the X fourth parameters corresponds to one or more first parameters; or the M second parameters of the second type element correspond to Y fourth parameters, where each second parameter among the M second parameters corresponds to one or more fourth parameters, or each fourth parameter among the Y fourth parameters corresponds to one or more second parameters. The fourth parameter includes one of: a DMRS port group, a time domain resource group, a frequency domain resource group, or one transmission occasion of the element.

Optionally, if the first parameter of the first type element is acquired according to more than one second type element, a transmission mode of the first type element is acquired according to a transmission mode of one second type element among the more than one second type element, or a transmission mode of the first type element is acquired according to a transmission mode of more than one second type element.

Acquiring the first parameter of the first type element according to the second parameter of the second type element includes one or more of scenes described below.

In scene one, a first parameter of an uplink element (that is, the first type element) is acquired according to a second parameter of a downlink element (that is, the second type element). The first parameter includes at least one of the following parameters: a spatial parameter, a power parameter, or a transmission mode. The second parameter includes at least one of the following parameters: a quasi co-location parameter or a transmission mode. The number of spatial parameters of the uplink element is N, and the number of quasi co-location parameters of the downlink element is M. An example is described below in which the first parameter includes the spatial parameter, and the spatial parameter of the uplink element is acquired according to the quasi co-location parameter of the downlink element. The method described below may be similarly adapted to the scene where the power parameter of the uplink element is acquired according to the quasi co-location parameter of the downlink element, by simply replacing the spatial parameter in the following description with the power parameter.

The uplink element satisfies at least one of characteristics described below. The uplink element is not configured with the first parameter through signaling information; the uplink element includes a PUSCH scheduled by DCI format 0_0, where a frequency domain bandwidth where the PUSCH is located is not configured with a PUCCH; a frequency domain bandwidth where the uplink element is located is configured with at least one spatial parameter; a central carrier of a frequency domain bandwidth where the uplink element is located is greater than a predetermined value; the number of sets of uplink sounding reference signals of a frequency domain bandwidth where the uplink element is located is greater than a predetermined value; or, at least one quasi co-location reference signal associated with a spatial reception parameter is configured or activated in a downlink frequency domain bandwidth corresponding to an uplink frequency domain bandwidth where the uplink element is located.

Optionally, the uplink element includes an uplink channel or an uplink signal, such as a PUCCH, a PUSCH, an SRS, and a physical random accessсChannel (PRACH), or the uplink element includes one item in an SRI mapping table of a PUSCH.

Optionally, the downlink element includes a downlink channel or a downlink signal, such as a CORESET, a PDSCH, a channel state information-reference signal (CSI-RS), and a synchronization signal and physical broadcast channel (PBCH) block (SSB), or the downlink element includes one item in a TCI state mapping table.

Optionally, acquiring the first parameter of the uplink element according to the second parameter of the downlink element includes one or more of scenes described below.

Figure 6:
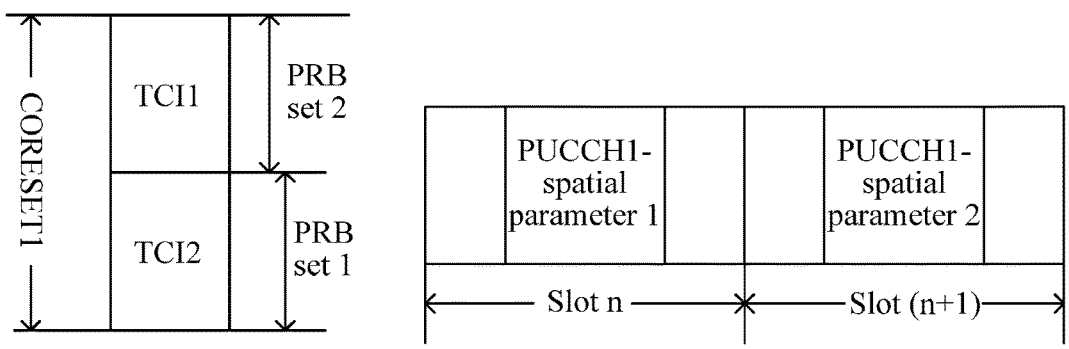
FIG. 6 is a diagram of spatial filter information on two time domain resources of a Physical Uplink Control Channel (PUCCH) acquired according to TCIs on two frequency domain resources in a CORESET respectively.

In scene one-1, the first parameter of the uplink element is acquired according to a second parameter of a CORESET (that is, the second type element) having the lowest CORESET identity (CORESET-ID) in a downlink bandwidth. As shown in FIG. 6, FIG. 6 is a diagram of spatial filter information on two time domain resources of a PUCCH acquired according to TCIs on two frequency domain resources in a CORESET respectively. The number N of first parameters of PUCCH1 is two, and the two first parameters correspond to two time domain resource groups of PUCCH1, where the two time domain resource groups are in slot (n) and slot (n+1) respectively; the number M of second parameters of CORESET1 is two, and the two second parameters correspond to different frequency domain resources of CORESET1. Optionally, a Control Resource Set (CORESET) is configured in a downlink frequency domain bandwidth corresponding to an uplink frequency domain bandwidth where the uplink element is located.

In scene one-2, the first parameter of the uplink element is acquired according to a second parameter of a CORESET (that is, the second type element) where a PDCCH scheduling the uplink element is located. The uplink element (that is, the first type element) has a corresponding PDCCH for scheduling the uplink element.

In scene one-3, the first parameter of the uplink element is acquired according to a predetermined TCI state (that is, the second parameter), where the predetermined TCI state (that is, the second parameter) includes one of: one or more TCI states having the lowest TCI state index in a TCI state set configured or activated by a PDSCH in a downlink frequency domain bandwidth; or a TCI state corresponding to one or more codepoints. One codepoint corresponds to one or more TCI states (that is, M TCI states), and at this time, M is equal to the number of TCI states corresponding to one codepoint. The codepoint is a codepoint in a TCI state mapping table. The TCI state mapping table is a TCI state mapping table activated by a MAC-CE for the PDSCH of the downlink frequency domain bandwidth, and the mapping table shows mapping relationships between codepoints of a TCI indicator field in DCI and TCI states as shown in table 1, where the codepoints correspond to bit field values of the TCI indicator field in the DCI. At this time, the TCI state mapping table is referred to as a parameter of the PDSCH (that is, the second type element), and a base station may not send the PDSCH. If the PDSCH is sent, the TCI state parameter of the PDSCH may be acquired according to the TCI state mapping table and the TCI indicator field indicated in the DCI. At this time, acquiring the first parameter of the first type element according to the second parameter of the second type element may also be referred to as acquiring the first parameter of the first type element according to the second parameter. Optionally, at this time, no CORESET is configured in a downlink frequency domain bandwidth corresponding to an uplink frequency domain bandwidth where the uplink element is located.

In scene one-4, a spatial parameter corresponding to one item in an SRI mapping table of a PUSCH is acquired according to a TCI state corresponding to one item in a TCI state mapping table of a PDSCH. For example, spatial relationship information corresponding to one SRI codepoint in Table 2 or Table 3 is acquired according to a TCI state corresponding to one TCI state codepoint in Table 1. That is, for example, a base station does not notify the SRI mapping table relationship of Table 2 or Table 3 through signaling, but only establishes the mapping relationships of Table 1 through signaling information, and then establishes Table 2 (or Table 3) according to Table 1. For example, first four codepoints among codepoints corresponding to one TCI state in Table 1 compose an SRI mapping table whose number of DMRS layers is equal to one. As shown in Table 4, when an SRI indicates one layer and the value of an SRI codepoint is equal to 00, the spatial parameter of the PUSCH is acquired according to a quasi co-location reference signal included in TCI state1, and optionally is acquired according to a quasi co-location reference signal associated with a spatial reception parameter in TCI state1. The first two codepoints among codepoints corresponding to two TCI states in Table 1 compose an SRI mapping table whose number of DMRS layers is equal to two, as shown in Table 5.

TABLE 4

| SRI codepoint value | TCI codepoint value | TCI state |
|---|---|---|
| 00 | 000 | TCI state 1 |
| 01 | 011 | TCI state 3 |
| 10 | 100 | TCI state 4 |
| 11 | 101 | TCI state 8 |

TABLE 5

| SRI codepoint value | TCI codepoint value | TCI state |
|---|---|---|
| 00 | 001 | TCI state 2, TCI state8 |
| 01 | 010 | TCI state 4, TCI state19 |

In scene one-5, the first parameter of the uplink element is acquired according to a second parameter of a PDSCH. Optionally, in a case where the second parameter is a quasi co-location parameter and a time interval between a PDCCH scheduling the PDSCH and the PDSCH is less than a predetermined threshold, the second parameter of the PDSCH is not acquired according to a second parameter indicated in the PDCCH scheduling the PDSCH; the quasi co-location parameter of the PDSCH having a scheduling interval less than a predetermined value is acquired according to one of following three quasi co-location parameters: information one, which is a quasi co-location parameter of a CORESET having the lowest CORESET-ID among CORESETs associated with a monitoring search space in a slot which is closest to the PDSCH; information two, which is the lowest codepoint among codepoints corresponding to two TCI states in a TCI state mapping table; information three, which is a quasi co-location parameter of a CORESET having the lowest CORESET-ID among CORESETs belonging a predetermined CORESET group and associated with a monitoring search space in a slot which is closest to the PDSCH.

Optionally, which one among the preceding three pieces of information is used for acquiring the quasi co-location parameter of the PDSCH having a scheduling interval less than a predetermined value is determined according to the number of CORESET groups and the largest number z of TCI states corresponding to one codepoint in the TCI state mapping table. When the number of CORESET groups is two, information three is used; when the number of CORESET groups is 1, information one is used; when the number of CORESET groups is 1 and the value of z is greater than 1, information two is used. At this time, the PDCCH scheduling the PDSCH also indicates a quasi co-location parameter, but this quasi co-location parameter is not used for the reception of the PDSCH. This quasi co-location parameter indicated in the PDCCH is referred to as information four. Optionally, in a case where the first parameter of the uplink element is acquired according to the second parameter of the PDSCH and the second parameter includes a quasi co-location parameter, it needs to be determined at this time that the first parameter of the uplink element is acquired according to which piece of information among the preceding pieces of information 1 to information 4. In one manner, the first parameter of the uplink element is determined according to one piece of information, among information one to information three, which is used for the reception of the PDSCH. In another manner, no matter which piece of information among information one to information three is used for the reception of the PDSCH, the first parameter of the uplink element is acquired according to information four.

In Table 4 and Table 5, the number of TCI states is equal to the number of DMRS layers of the PUSCH, each TCI state corresponds to one DMRS layer, and at this time, the number N of spatial parameters corresponding to one item in the SRI mapping table (that is, a row in Table 4 and Table 5) is represented by the number of DMRS layers, that is, the number N of first parameters is equal to the number of DMRS layers. The embodiment does not exclude a case where N is equal to the number of DMRS groups of the PUSCH, and DMRSs in one DMRS group acquire spatial information of the DMRSs according to the same TCI state. Optionally, the number of DMRS groups is acquired according to signaling information notified by the base station, or is acquired according to information of a code division multiplexing (CDM) group where DMRSs are located. At this time, the number N of first parameters is equal to the number of DMRS port groups. Optionally, at this time, the PDSCH and the PUSCH share the same table as shown in Table 1, or the PUSCH uses first predetermined number of items in Table 1.

Figure 7:
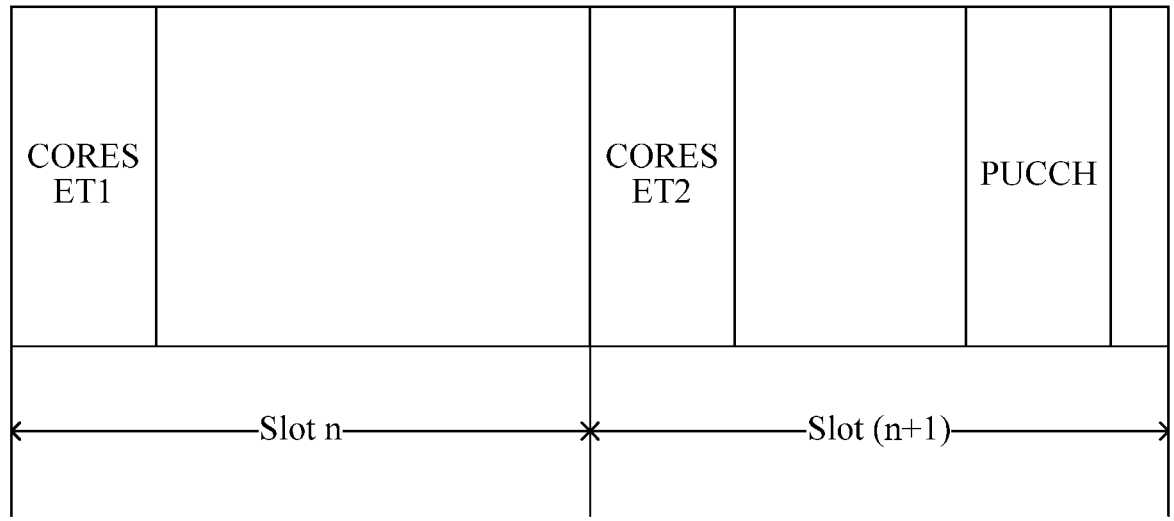
FIG. 7 is a diagram of spatial filter information of a PUCCH acquired according to a CORESET.

If solution 1 is used, in scene one-1, the number N of first parameters of the uplink element is required to be less than or equal to the number M of second parameters of the CORESET (that is, the second type element) having the lowest CORESET-ID in the downlink frequency domain bandwidth. Alternatively, the rule in scene one-1 is changed as described below. The first parameter of the uplink element is acquired according to the second parameter of the CORESET (that is, the second type element) having the lowest CORESET-ID in a CORESET set satisfying a predetermined characteristic in the downlink frequency domain bandwidth, where the predetermined characteristic includes that the number of second parameters of CORESET is greater than or equal to N. As shown in FIG. 7, FIG. 7 is a diagram of spatial filter information of a PUCCH acquired according to a CORESET. The number of second parameters of CORESET1 is 1, and the number of second parameters of CORESET2 is 2. If the number N of first parameters of the PUCCH is 1, the first parameter of the PUCCH is acquired according to the second parameter of the CORESET1; and if the number N of first parameters of the PUCCH is 2, the first parameter of the PUCCH is acquired according to the second parameter of CORESET2. That is, at this time, the CORESET who has the lowest CORESET index and whose number of second parameters is greater than or equal to 2 is CORESET2, rather than CORESET1.

In scene one-2, the number M of second parameters of the CORESET where the PDCCH scheduling the uplink element is located is required to be greater than or equal to the number N of first parameters of the uplink element.

In scene one-3, the number M of TCI states corresponding to one codepoint is required to be greater than or equal to the number N of first parameters of the uplink element.

In scene one-4, the number N of DMRS layers of the uplink element (or the number N of DMRS groups) is less than or equal to the number M of TCI states corresponding to one codepoint.

Figure 8:
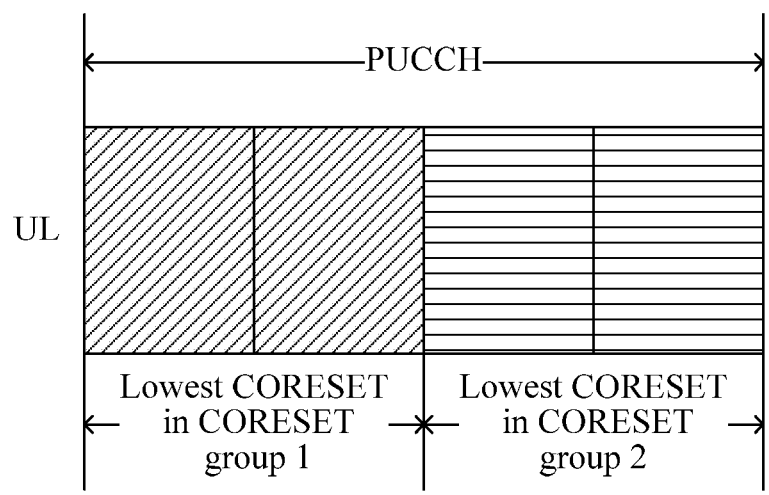
FIG. 8 is a diagram of spatial filter information on different time domain resources of a PUCCH acquired according to lowest CORESETs in different CORESET groups respectively.
Figure 9:
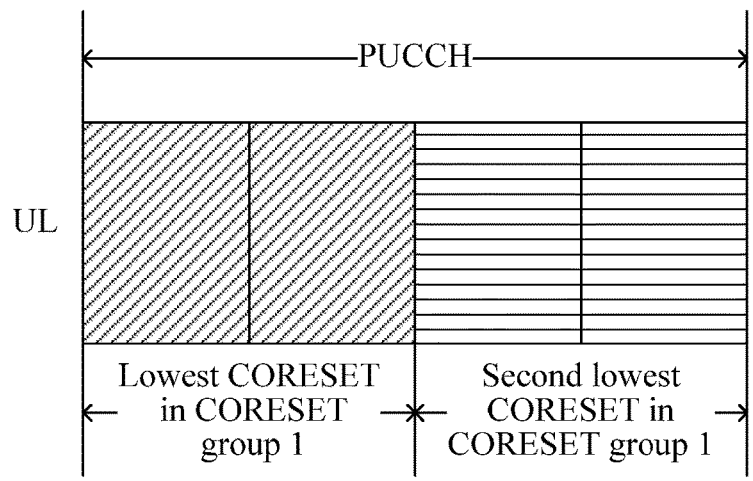
FIG. 9 is a diagram of spatial filter information on different time domain resources of a PUCCH acquired according to two lowest CORESETs in a CORESET group respectively.

If solution 2 is used, in scene one-1, more than one downlink element includes a downlink element associated with multiple CORESET groups. For example, the first parameter of the uplink element is acquired according to second parameters of CORESETs in multiple CORESET groups. As shown in FIG. 8, FIG. 8 is a diagram of spatial filter information on different time domain resources of a PUCCH acquired according to lowest CORESETs in different CORESET groups respectively. Different time domain resource groups of one PUCCH correspond to different first parameters, where a first parameter of a first time frequency resource group is acquired according to a second parameter of the lowest CORESET in CORESET group 1, and a first parameter of a second time resource group is acquired according to a second parameter of the lowest CORESET belonging to CORESET group 2. Alternatively, at this time, more than one downlink element includes multiple downlink elements associated with the same CORESET group. For example, the first parameter of the uplink element is acquired according to second parameters of multiple CORESETs in the same CORESET group. As shown in FIG. 9, FIG. 9 is a diagram of spatial filter information on different time domain resources of a PUCCH acquired according to two lowest CORESETs in one CORESET group respectively. Different time frequency domain resources of one PUCCH correspond to different first parameters, where a first parameter of a first time resource is acquired according to a second parameter of the lowest CORESET in CORESET group 1, and a first parameter of a second time resource is acquired according to a second parameter of the second lowest CORESET in CORESET group 1.

Optionally, whether more than one downlink element includes a downlink element associated with multiple CORESET groups or includes multiple downlink elements in the same CORESET group may be determined according to signaling information or a predetermined rule. That is, whether the first parameter of the PUCCH is acquired in the manner in FIG. 8 or the manner in FIG. 9 may be determined according to signaling information or a predetermined rule. For example, when one CORESET group exists, the first parameter of the PUCCH is acquired in the manner in FIG. 9, and when two CORESET groups exist, the first parameter of the PUCCH is acquired in the manner in FIG. 8.

In scene one-2, at this time, the PDCCH scheduling the uplink element is associated with multiple CORESETs, or the multiple CORESETs all include the PDCCH scheduling the uplink element. For example, one PDCCH is repeatedly transmitted in multiple CORESETs, or the multiple CORESETs include a part of the PDCCH scheduling the uplink element, respectively. Optionally, the multiple CORESETs belong to one CORESET group, or the multiple CORESETs are required to include CORESETs belonging to different CORESET groups. Whether the multiple CORESETs belong to one CORESET group or multiple CORESET groups is determined according to signaling information or a predetermined rule.

In scene one-3, at this time, the first parameter of the uplink element is acquired according to TCI states corresponding to more than one codepoint. Optionally, the more than one codepoint corresponds to the same TCI state mapping table; for example, the more than ore codepoint is the lowest codepoint and the second lowest codepoint of one TCI state mapping table. Alternatively, the more than one codepoint includes codepoints corresponding to different TCI state mapping tables, where the different TCI state mapping tables correspond to different CORESET groups, respectively, of the same frequency domain bandwidth; for example, the more than one codepoint includes the lowest one or more codepoints in each TCI state mapping table.

In scene one-4, in a case where the number N of DMRS layers (or the number N of DMRS port groups) is greater than the number of TCI states corresponding to one codepoint, similar to scene one-3, the first parameter of the uplink element is acquired based on TCI states corresponding to more than one codepoint at this time.

If solution 3 is used, M first parameters among N first parameters of the uplink element are acquired according to M second parameters of the second type element, and remaining (N−M) first parameters among the N first parameters of the uplink element are acquired according to the third parameter. The third parameter includes a parameter configured by RRC signaling, MAC-CE signaling, or DCI signaling, where the third parameter is a proprietary parameter, such as a parameter specially configured for the (N−M) first parameters of the uplink element. Alternatively, a corresponding relationship exists between the third parameter and the second type element, that is, if the M first parameters among the N first parameters of the preceding uplink element are acquired according to a second parameter of one second type element, then the (N−M) first parameters are acquired according to a third parameter corresponding to the one second type element. The second parameter is a transmission parameter of the second type element, and the third parameter is not a parameter required for the transmission of the second type element; for example, in scene one-1 and scene one-2, a quasi co-location relationship exists between the second parameter and the DMRS of the CORESET, but no quasi co-location relationship exists between the third parameter and the DMRS of the CORESET.

Alternatively, the third parameter is a parameter activated by a MAC-CE. For example, the third parameter includes a predetermined TCI state, where the predetermined TCI state includes one of: one or more TCI states having the lowest TCI state index in a TCI state set configured or activated for a PDSCH in a downlink frequency domain bandwidth, or a predetermined item TCI state corresponding to one or more codepoints in a TCI state mapping table. Optionally, the downlink frequency domain bandwidth includes a downlink frequency domain bandwidth corresponding to an uplink frequency domain bandwidth where the uplink element is located. For example, N=2, M=1, one first parameter among two first parameters of a PUCCH (that is, the uplink element) is acquired according to the second parameter of the preceding second type element, and another first parameter of the PUCCH is acquired according to a predetermined item TCI state included in a predetermined item codepoint in a TCI state mapping table of the PDSCH. The predetermined item TCI state is acquired according to a predetermined item among multiple TCI states included in the predetermined item codepoint; for example, the predetermined item TCI state is acquired according to the second TCI state among the multiple TCI states included in the predetermined item codepoint. It is assumed that the TCI state mapping table of the PDSCH is as shown in Table 6, the predetermined item codepoint includes one of codepoints described below.

The predetermined item codepoint may include A: the lowest codepoint, that is, the codepoint whose value is 0. For example, for codepoint '00' in Table 1, another first parameter of the uplink element is acquired according to the second TCI state corresponding to codepoint '00', that is, according to TCI state 2.

The predetermined item codepoint may include B: the lowest codepoint among codepoints satisfying a predetermined characteristic in the TCI state mapping table. The codepoints satisfying the predetermined characteristic include a codepoint of one second parameter of the second type element. For example, if the second parameter is TCI state 1, codepoints including TCI state 1 are found first from the TCI state mapping table; as shown in Table 1, codepoint '10' and codepoint '11' exist, and then the lowest, that is, codepoint '10', of codepoint '10' and codepoint '11' is selected.

The predetermined item codepoint may include C: the lowest codepoint among codepoints satisfying a predetermined characteristic in the TCI state mapping table. The codepoints satisfying the predetermined characteristic include a codepoint whose number of corresponding TCI states satisfies the predetermined characteristic. For example, if the number of TCI states is greater than 1, codepoints whose number of corresponding TCI states is greater than 1 are found first in the TCI state mapping table; as shown in Table 1, codepoint '00', codepoint '10', and codepoint '11' exist, and then the lowest, that is, codepoint '00', among codepoint '00', codepoint '10', and codepoint '11' is selected.

TABLE 6

| codepoint | TCI state |
|---|---|
| 00 | TCI state 10, TCI state 2 |
| 01 | TCI state 5 |
| 10 | TCI state 1, TCI state 25 |
| 11 | TCI state 1, TCI state 36 |

After the preceding predetermined item codepoint is found, the first parameter is acquired according to the second item TCI state (that is, the predetermined item TCI state) among TCI states corresponding to the preceding predetermined item codepoint. If the predetermined item codepoint does not include the predetermined item TCI state at this time, for example the number of TCI states corresponding to preceding codepoint '00' or codepoint '10' is 1, a fourth parameter part corresponding to the (N−M) first parameters of the uplink element is not sent. For example, N first parameters correspond to N time domain resource groups, and last (N−M) time domain resource groups of the uplink element are not sent. Alternatively, the (N−M) first parameters of the uplink element are determined according to a second parameter having the largest index (or the smallest index) among M second parameters. Alternatively, fourth parameters corresponding to N first parameters are divided into M fourth parameters, and a first parameter corresponding to each fourth parameter is separately acquired according to one second parameter among M second parameters. For example, N first parameters correspond to N time domain resource groups, and at this time, the N time domain resource groups are divided into M time domain resource groups.

If solution 4 is used, for example, N=1, M=2, one first parameter corresponds to one DMRS port group (or one DMRS port), and two second parameters correspond to two frequency domain resource groups, then the one first parameter is acquired according to a second parameter corresponding to a frequency domain resource group having an index of 0 of the two frequency domain resource groups.

If solution 5 is used, in scene one-1 or scene one-2, if the minimum value of the number of second parameters of one CORESET is 1, the number N of first parameters of the preceding uplink element (that is, the preceding first type element) is required to be less than or equal to 1; in scene one-3, if the minimum value of the number of TCI states corresponding to one codepoint in the TCI state mapping table is 1, the number N of first parameters of the preceding uplink element (that is, the preceding first type element) is required to be less than or equal to 1.

If solution 6 is used, in scene one-1 or scene one-2, the number N of first parameters of the preceding uplink element (that is, the preceding first type element) is required to be less than or equal to M_max. M_max includes one of: the maximum value of the number of second parameters of one CORESET; the maximum value of total numbers of different second parameters in a set composed of second parameters of all CORESETs within a time period; the maximum value of total numbers of different second parameters in a set composed of second parameters of all CORESETs in a frequency domain bandwidth within a time period; the number of second parameters of one CORESET; total numbers of different second parameters in a set composed of second parameters of all CORESETs within a time period; or total numbers of different second parameters in a set composed of second parameters of all CORESETs in a frequency domain bandwidth within a time period.

Figure 10:
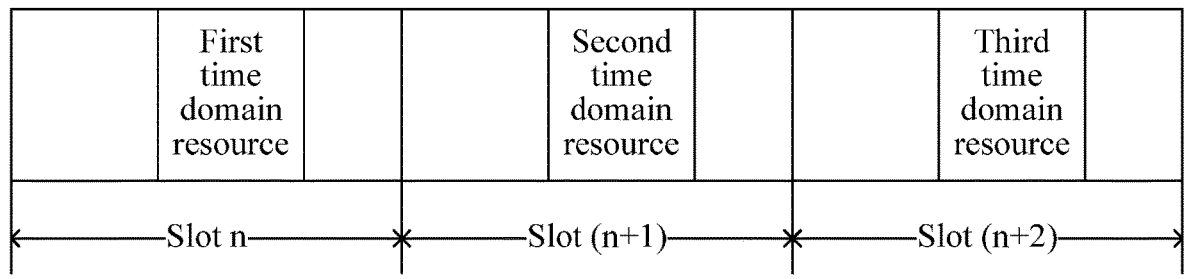
FIG. 10 is a diagram of last (N–M) time domain resources of a PUSCH acquired according to a second parameter having the largest index of a first element.

If solution 7 is used, for example, N=3, M=2, N first parameters correspond to N time domain resource groups, and M second parameters correspond to M frequency domain resource groups, then M first parameters of first M time domain resource groups among the N time domain resource groups are acquired according to second parameters corresponding to the M frequency domain resource groups, that is, a first parameter of a j-th time domain resource group of the uplink element is acquired according to a second parameter corresponding to a j-th frequency domain resource group of the second type element, where j=0, 1, . . . , or M−1; last (N−M) time domain resource groups among the N time domain resource groups are combined into one time domain resource group, and a first parameter of the combined time domain resource group is acquired according to a second parameter having the largest index (or the smallest index) among the M second parameters. As shown in FIG. 10, FIG. 10 is a diagram of last (N−M) time domain resource groups of a PUSCH acquired according to a second parameter having the largest index of a first type element. A first parameter of a first time domain resource group (that is, a time domain resource group having an index of 0) of a PUCCH/PUSCH is acquired according to a second parameter having and index of 0, and a second time domain resource group and a third time domain resource group of the PUCCH/PUSCH are acquired according to a second parameter having an index of 1.

If solution 8 is used, for example, N=3, M=2, N first parameters correspond to N time domain resource groups, and M second parameters correspond to M frequency domain resource groups, then at this time, the N time domain resource groups are divided into M time domain resource groups, each time domain resource group correspond to one first parameter, and a first parameter of a j-th time domain resource group of the uplink element is acquired according to a second parameter corresponding to a j-th frequency domain resource group of the second type element, that is, N is acquired according to the value of M at this time. For example, the uplink element includes three time domain resource groups, that is, {OFDM1, OFDM2}, {OFDM3, OFDM4}, and {OFDM5, OFDM6}, respectively, then at this time, {OFDM1, OFDM2} and {OFDM3, OFDM4} may be combined into one time domain resource group {OFDM1, OFDM2, OFDM3, OFDM4}, {OFDM1, OFDM2, OFDM6, OFDM6} is acquired according to a second parameter having an index of 0, and {OFDM4, OFDM5} is acquired according to a second parameter having an index of 1. Alternatively, the three time domain resource groups are re-divided into two time domain resource groups, that is, {OFDM1, OFDM2, OFDM3} and {OFDM4, OFDM5, OFDM6}, a first parameter of the first time domain resource group is acquired according to a second parameter having an index of 0, and a first parameter of the second time domain resource group is acquired according to a second parameter having an index of 1.

If solution 9 is used, in scene one-1, if the number N of first parameters of the uplink element is less than or equal to the number M of second parameters of the CORESET having the lowest CORESET-ID, the first parameter of the uplink element is acquired according to the second parameter of the CORESET having the lowest CORESET-ID. When the number N of first parameters of the uplink element is greater than the number M of second parameters of the CORESET having the lowest CORESET-ID, the first parameter is acquired according to a third type element. The third type element does not include the CORESET having the lowest CORESET-ID. For example, the third type element is a PDSCH, the first parameter is acquired according to a predetermined item TCI state in a TCI state mapping table configured for the PDSCH in a downlink frequency domain bandwidth corresponding to an uplink frequency domain bandwidth where the uplink element is located; for example, the first parameter is acquired according to a TCI state corresponding to the lowest codepoint among multiple codepoints having the largest number of TCI states in the TCI state mapping table. The method of solution 9 may be used in scene one-2, scene one-3, and scene one-4, which is not repeated here.

Optionally, acquiring the first parameter of the uplink element according to the second parameter of the downlink element described above includes the following. The first parameter of the uplink element is acquired according to a second parameter associated with a spatial reception parameter of the downlink element. The first parameter includes at least one of the following parameters: a spatial parameter, a power parameter, or a transmission mode, and the second parameter includes at least one of the following parameters: a quasi co-location parameter or a transmission mode. Alternatively, in a case where the downlink element has the second parameter associated with a spatial reception parameter, the first parameter of the uplink element is acquired according to the second parameter associated with the spatial reception parameter of the downlink element; otherwise, the first parameter of the uplink element is acquired according to a second parameter associated with a second quasi co-location hypothesis of the downlink element. The second quasi co-location hypothesis includes at least one of: Doppler shift, Doppler spread, an average delay, delay spread, or average gain.

Optionally, acquiring the first parameter of the first type element according to the second parameter of the second type element includes the following. A first parameter of a first uplink element is acquired according to a second parameter of a second uplink element, where the first parameter and/or the second parameter include at least one of the following parameters: a spatial parameter, a power parameter, or a transmission mode.

Optionally, acquiring the first parameter of the first type element according to the second parameter of the second type element includes the following. A first parameter of a first downlink element is acquired according to a second parameter of a second downlink element, where the first parameter and/or the second parameter include at least one of the following parameters: a quasi co-location parameter or a transmission mode.

Optionally, in a case where the first parameter includes a transmission mode of the uplink element and the second parameter includes a transmission mode of the downlink element, acquiring the second parameter of the second type element according to the first parameter of the first type element described above includes the following. The transmission mode of the uplink element is acquired according to the transmission mode of the downlink element. For example, the transmission mode of the uplink element is acquired according to at least one of: a transmission mode of the CORESET having the lowest CORESET-ID in scene one-1; a transmission mode of the CORESET where the PDCCH scheduling the uplink element is located in scene one-2; a transmission mode of a PDSCH associated with a TCI state corresponding to a predetermined item codepoint in scene one-3; or a transmission mode corresponding to one item codepoint in the TCI state mapping table of the PDSCH in scene one-4. In scene one-1, mapping relationships between N fifth parameters of the preceding uplink element and fourth parameters of the preceding uplink element are determined according to mapping relationships between M second parameters of the CORESET having the lowest CORESET-ID and fourth parameters of the CORESET, or the number of fourth parameters of the uplink element is determined according to the number of fourth parameters of the CORESET having the lowest CORESET-ID, or the number of fifth parameters of the uplink element is determined according to the number of second parameters of the CORESET having the lowest CORESET-ID.

In scene one, the first parameter of the uplink element is acquired according to the second parameter of the downlink element. Similarly, the preceding solution may also be applied to the scene where the second parameter of the downlink element is determined according to the first parameter of the uplink element.

In scene two, a first parameter of a first uplink element (that is, the first type element) is acquired according to a second parameter of a second uplink element (that is, the second type element).

The first parameter and/or the second parameter include at least one of the following parameters: a spatial parameter, a power parameter, or a transmission mode. Optionally, the second uplink element includes a PUCCH having the lowest PUCCH resource index in a frequency domain bandwidth where the first uplink element is located. The first uplink element includes one of: a PUSCH scheduled by DCI 0_0, where an uplink frequency domain bandwidth where the PUSCH is located is configured with a PUCCH; or an SRS not configured with a first parameter. Optionally, the first uplink element and the second uplink element are in the same frequency domain bandwidth.

If solution 1 is used, the number N of first parameters of the PUSCH (or the SRS not configured with a first parameter) scheduled by DCI 0_0 is required to be less than or equal to a PUCCH having the lowest PUCCH resource index in the frequency domain bandwidth where the PUSCH is located.

Figure 11:
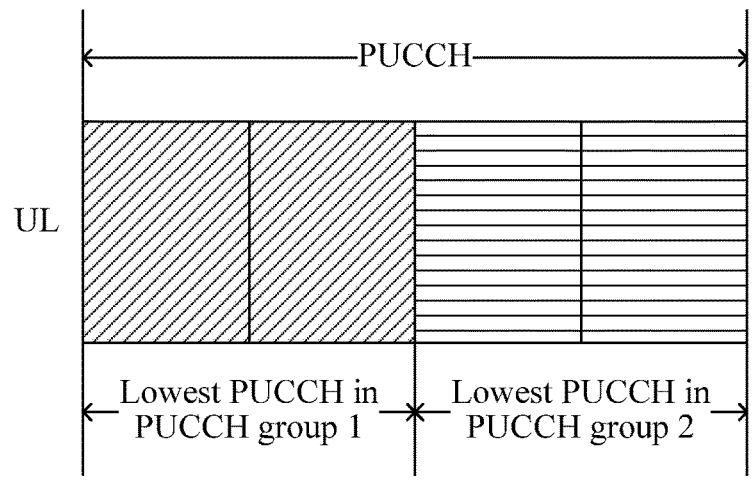
FIG. 11 is a diagram of first parameters on different time domain resources of a PUSCH acquired according to second parameters of lowest PUCCH resources in different PUCCH groups.
Figure 12:
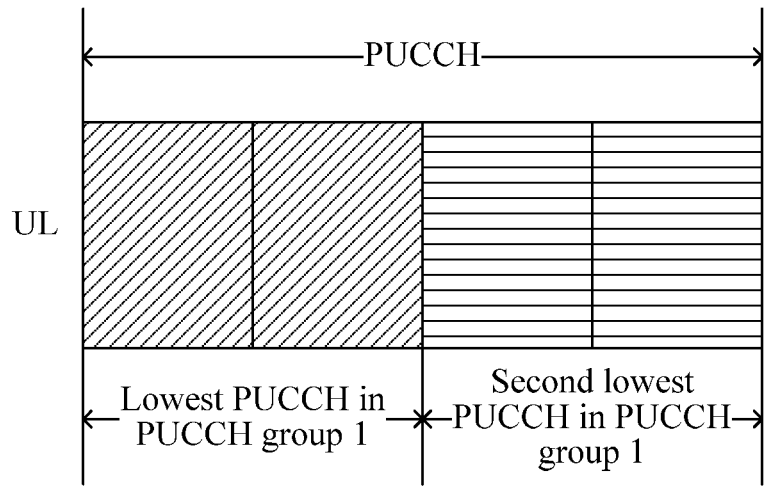
FIG. 12 is a diagram of first parameters on different time domain resources of a PUSCH acquired according to second parameters of two lowest PUCCH resources in the same PUCCH group.

If solution 2 is used, the number N of first parameters of the PUSCH (or the SRS not configured with a first parameter) scheduled by DCI 0_0 is acquired according to second parameters of L PUCCH resources having the lowest PUCCH resource index in the frequency domain bandwidth where the PUSCH is located, where L is a positive integer greater than or equal to 1. Optionally, the L PUCCH resources include PUCCH resource belonging to different PUCCH resource groups. For example, the L PUCCH resources include L1 PUCCH resources having the lowest resource index in a first PUCCH resource group and L2 PUCCH resources having the lowest resource index in a second PUCCH resource group, where L1 and L2 are positive integers greater than or equal to 1, as shown in FIG. 11, and/or, L1+L2=L. FIG. 11 is a diagram of first parameters on different time domain resources of a PUSCH acquired according to second parameters of PUCCH resources having the lowest PUCCH resource index in different PUCCH groups, where L=2, L1=1, and L2=1. Alternatively, when L is greater than 1, the L PUCCH resources belong to the same PUCCH resource group. For example, the L PUCCH resources are L PUCCH resources having the lowest PUCCH resource index in the same PUCCH resource group. As shown in FIG. 12, FIG. 12 is a diagram of first parameters on different time domain resources of a PUSCH acquired according to second parameters of two PUCCH resources having the lowest PUCCH resource index in the same PUCCH group, where L=2. Optionally, PUCCH resources in one PUCCH resource group are associated with the same group index, and different PUCCH resource groups are associated with different group indexes. The group index includes a PUCCH resource group index and/or a CORESET group index corresponding to a PUCCH. Optionally, whether the L PUCCH resource groups belong to one PUCCH resource group or multiple PUCCH resource groups is determined according to signaling information and/or a predetermined rule. That is, whether to acquire a first parameter of a PUSCH according to the manner in FIG. 11 or the manner in FIG. 12 is determined according to signaling information and/or a predetermined rule.

If solution 3 is used, M first parameters among the N first parameters of the PUSCH (or the SRS not configured with a first parameter) scheduled by DCI 0_0 are acquired according to M second parameters of the PUCCH resource having the lowest PUCCH resource index described above. Remaining (N−M) first parameters of the PUSCH are acquired according to a third parameter. The third parameter is acquired according to signaling information and/or a predetermined rule. For example, the signaling information includes one or more of an RRC, a MAC-CE, and DCI. Alternatively, a corresponding relationship exists between the third parameter and the PUCCH resource having the lowest PUCCH resource index. However, the third parameter is specially configured for the (N−M) first parameters of the PUSCH, and the transmission of the PUCCH resource having the lowest PUCCH resource index does not use the third parameter. Alternatively, the third parameter is associated with a third type element. For example, the third parameter is acquired according to a parameter of a CORESET (that is, the third type element) satisfying a predetermined characteristic and belonging to a predetermined frequency domain bandwidth. Alternatively, the third parameter is acquired according to a parameter of a CORESET (that is, the third type element) where DCI 0_0 scheduling the PUSCH is located.

If solution 4 is used, a first parameter having an index of j of the PUSCH is acquired according to a second parameter having an index of j of the PUCCH, where j=0, 1, . . . , or M−1, or j∈{0, 1, . . . , N−1}.

If solution 5 is used, and if the minimum value of the number of second parameters of one PUCCH is M_min, the number N of first parameters of the preceding PUSCH (or SRS not configured with a first parameter) scheduled by DCI0_0 is less than or equal to M_min.

If solution 6 is used, the number N of first parameters of the PUSCH (or the SRS not configured with a first parameter) scheduled by DCI0_0 is less than or equal to M_max, and M_max satisfies one of the following: the maximum value of the number of second parameters of one PUCCH being M_max; the maximum value of total numbers of second parameters activated for all PUCCHs within a time period being M_max; the maximum value of total numbers of second parameters activated for all PUCCHs in a predetermined bandwidth within a time period; the total number of second parameters activated for all PUCCHs within a time period; the total number of second parameters activated for all PUCCHs in a predetermined bandwidth within a time period being M total.

If solution 7 is used, for example, N=3, M=1, N first parameters correspond to N time domain resource groups of the first type element, and M second parameters correspond to M time domain resource groups of the second type element, then the N time domain resources are combined into one time domain resource group, and a first parameter of the one time domain resource group is acquired according to the M second parameters of the second type element.

If solution 8 is used, for example, N=3, M=2, N first parameters correspond to N time domain resource groups of the first type element, and M second parameters correspond to M time domain resource groups of the second type element, then the N time domain resources are re-divided into M time domain resource groups, and a first parameter corresponding to a time domain resource group having an index of j is acquired according to a second parameter having an index of j of the second type element, where j=0, 1, . . . , or M−1, or j∈{0, 1, . . . , N−1}.

If solution 9 is used, in a case where N is less than or equal to M, the first parameter of the PUSCH (or the SRS not configured with a first parameter) scheduled by DC0_0 is acquired according to a second parameter of one or more PUCCHs having the lowest PUCCH resource index; in a case where N is greater than M, the first parameter of the PUSCH (or the SRS not configured with a first parameter) scheduled by DC0_0 is acquired according to a third type element, where the third type element does not include the preceding one or more PUCCHs having the lowest PUCCH resource index.

In the preceding solution, N is a parameter configured in signaling information for configuring the PUSCH (or the SRS). When any one of the preceding solutions 1, 4, 5, 6, 7 and 8 is used, the value of N may not be configured in the information for configuring the PUSCH (or the SRS), and the value of N is obtained according to the methods in the preceding solutions.

Optionally, in a case where the first parameter includes a first transmission mode of the first uplink element and the second parameter includes a second transmission mode of the second uplink element, acquiring the second parameter of the second type element according to the first parameter of the first type element includes the following. The second transmission mode of the second uplink element is acquired according to a first transmission mode of a first uplink element. For example, a second transmission mode of the PUSCH scheduled by DCI 0_0 is acquired according to a second transmission mode of the PUCCH having the lowest PUCCH resource index. Mapping relationships between N first parameters of the preceding PUSCH and fourth parameters of the PUSCH are determined according to mapping relationships between M second parameters of the preceding PUCCH and fourth parameters of the PUCCH; or the number of fourth parameters of the preceding PUSCH is determined according to the number of fourth parameters of the preceding PUCCH; or the number N of first parameters of the preceding PUSCH is determined according to the number M of second parameters of the preceding PUCCH.

In scene three, a first parameter of a first downlink element is acquired according to a second parameter of a second downlink element. The number of first parameters of a PDSCH is N, and the number of second parameters of the second type element is M. The first parameter and/or the second parameter include at least one of the following parameters: a quasi co-location parameter or a transmission mode.

Optionally, the downlink element includes one of: a downlink channel, a downlink signal, or one item codepoint in a TCI state mapping table of the PDSCH. Optionally, the first type element and the second type element are in the same frequency domain bandwidth, where the frequency domain bandwidth includes one of: a serving cell, a carrier, a component carrier, a bandwidth part (BWP), or a continuous PRB set. Acquiring the first parameter of the first downlink element according to the second parameter of the second downlink element includes at least one of cases described below.

In scene three-1, a first parameter of a PDSCH/aperiodic-channel state indication-reference signal (AP-CSI-RS) is determined according to a second parameter of a CORESET (that is, the second type element) having the lowest CORESET index and associated with a monitoring search space in a slot which is closest to the PDSCH/AP-CSI-RS in a slot set including CORESETs. Optionally, the PDSCH/AP-CSI-RS satisfies the characteristic described below. A frequency domain bandwidth where the PDSCH/AP-CSI-RS is located is configured with at least one quasi co-location reference signal associated with a spatial reception parameter, and a time interval between a PDCCH scheduling the PDSCH/AP-CSI-RS and the PDSCH/AP-CSI-RS is less than a predetermined threshold.

In scene three-2, a first parameter of a PDSCH/AP-CSI-RS is acquired according to a second parameter of a CORESET (that is, the second type element) where a PDCCH scheduling the PDSCH/AP-CSI-RS is located. Optionally, the PDSCH/AP-CSI-RS satisfies the characteristics described below. The PDCCH scheduling the PDSCH/AP-CSI-RS does not include indication information of a quasi co-location parameter of the PDSCH/AP-CSI-RS; a frequency domain bandwidth where the PDSCH/AP-CSI-RS is located is configured with at least one quasi co-location reference signal associated with a spatial reception parameter; a time interval between the PDCCH scheduling PDSCH/AP-CSI-RS and the PDSCH/AP-CSI-RS is greater than or equal to a predetermined threshold.

In scene three-3, a first parameter of a PDSCH/AP-CSI-RS is acquired according to a predetermined item TCI state (that is, the second parameter) in a TCI state mapping table in a frequency domain bandwidth where the PDSCH/AP-CSI-RS is located. Optionally, the PDSCH/AP-CSI-RS satisfies the characteristics described below. A PDCCH scheduling the PDSCH/AP-CSI-RS and the PDSCH/AP-CSI-RS are in different frequency domain bandwidths (or the largest number of TCI states corresponding to one item codepoint in a TCI state mapping table activated for the PDSCH/AP-CSI-RS in the frequency domain bandwidth where the PDSCH/AP-CSI-RS is located); the frequency domain bandwidth where the PDSCH/AP-CSI-RS is located is configured with at least one quasi co-location reference signal associated with a spatial reception parameter; a time interval between a PDCCH scheduling the PDSCH/AP-CSI-RS and the PDSCH/AP-CSI-RS is less than a predetermined threshold.

Figure 13:
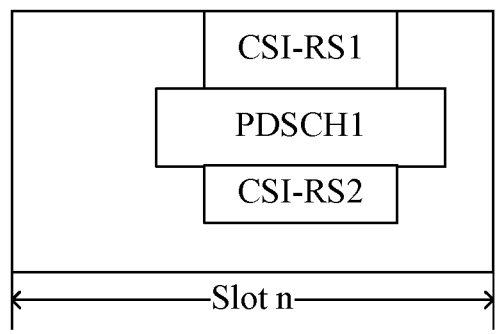
FIG. 13 is a first diagram of CSI-RS1 having a scheduling interval less than a predetermined threshold, CSI-RS2 having a scheduling interval greater than a predetermined threshold and, PDSCH1 having a scheduling interval greater than a predetermined threshold.
Figure 14:
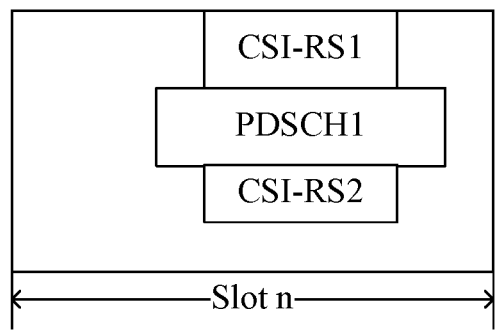
FIG. 14 is a second diagram of CSI-RS1 having a scheduling interval less than a predetermined threshold, CSI-RS2 having a scheduling interval greater than a predetermined threshold, and PDSCH1 having a scheduling interval greater than a predetermined threshold.

In scene three-4, in a case where an intersection between time domain resources of the first downlink element having a scheduling interval less than a first predetermined threshold and time domain resources of the second downlink element is non-empty, the first parameter of the first downlink element is acquired according to the second parameter of the second downlink element. The second downlink element includes at least one of: a periodic downlink element, a semi-persistent downlink element, an aperiodic downlink element having a scheduling interval greater than or equal to a second predetermined threshold, a CORESET, or a synchronization signal, where when the first downlink element and the second downlink element are each a PDSCH, the first predetermined threshold is equal to the second predetermined threshold. When the first downlink element is a PDSCH, the first predetermined threshold is a first value, and when the first downlink element is an AP-CSI-RS, the first predetermined threshold is a second value. As shown in FIG. 13 to FIG. 14, FIG. 13 is a first diagram of CSI-RS1 having a scheduling interval less than a predetermined threshold, CSI-RS2 having a scheduling interval greater than a predetermined threshold, and PDSCH1 having a scheduling interval greater than a predetermined threshold; and FIG. 14 is a second diagram of CSI-RS1 having a scheduling interval less than a predetermined threshold, CSI-RS2 having a scheduling interval greater than a predetermined threshold, and PDSCH1 having a scheduling interval greater than a predetermined threshold. The scheduling interval of CSI-RS1 is less than a first predetermined threshold, CSI-RS2 is a periodic CSI-RS, and a scheduling interval of PDSCH1 is greater than or equal to a second predetermined threshold. A first parameter of CSI-RS1 is acquired according to which one of a second parameter of CSI-RS2 or a second parameter of PDSCH1, or how a first parameter of CSI-RS1 is acquired according a second parameter of CSI-RS2 and a second parameter of PDSCH1. The preceding TCI state mapping table is a TCI state mapping table activated by a MAC-CE command for a PDSCH in a frequency domain bandwidth where the PDSCH/AP-CSI-RS is located, as shown in Table 1.

Figure 15:
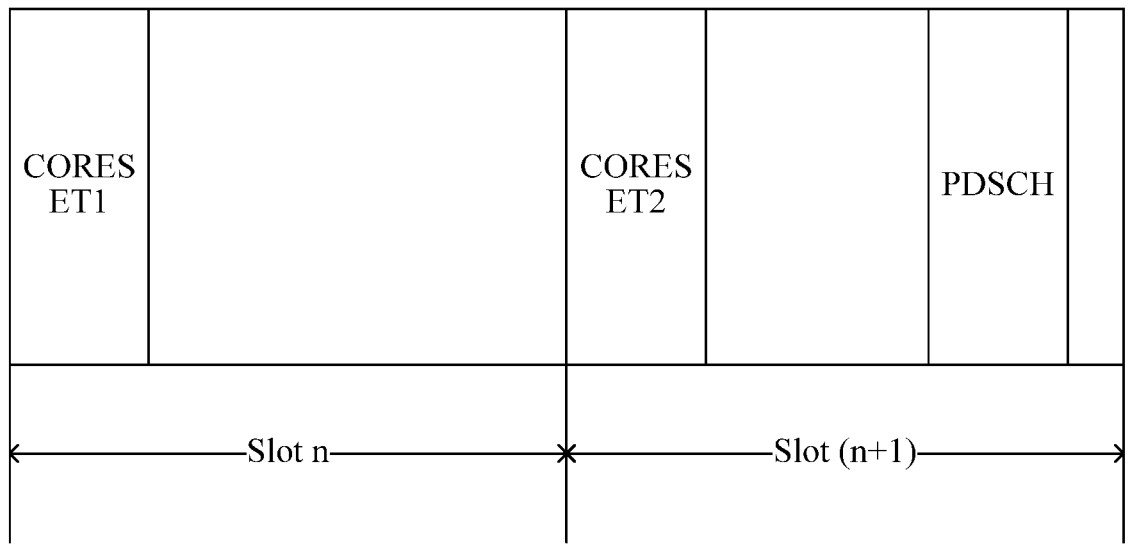
FIG. 15 is a diagram of a first parameter of a PDSCH/AP-CSI-RS acquired according to the lowest CORESET in the closest slot.

If solution 1 is used, N is required to be less than or equal to M. In scene three-1, the number N of first parameters of the PDSCH/AP-CSI-RS is less than the number M of quasi co-location parameters of the CORESET having the lowest CORESET index. As shown in FIG. 15, FIG. 15 is a diagram of a first parameter of a PDSCH/AP-CSI-RS acquired according to the lowest CORESET in the closest slot. The CORESET in the slot closest to the PDSCH/AP-CSI-RS is CORESET2 in slot (n+1), the number of quasi co-location parameters of CORESET2 is 1, and the number of quasi co-location parameters of the PDSCH/AP-CSI-RS cannot be greater than 1. In scene three-2, the number of first parameters of the PDSCH/AP-CSI-RS is less than or equal to the number M of second parameters of the CORESET where the PDCCH scheduling the PDSCH/AP-CSI-RS is located. In scene three-3, the number of first parameters of the PDSCH/AP-CSI-RS is less than or equal to the number of predetermined item TCI states. In scene three-4, the number N of first parameters of a PDSCH/AP-CSI-RS having a scheduling interval less than a first predetermined threshold is less than or equal to the number M of second parameters of the second downlink element, where a time domain intersection between the PDSCH/AP-CSI-RS and the second downlink element is non-empty.

If solution 2 is used, in scene three-1, for example, N=3 and M=1, the second parameter of the PDSCH/AP-CSI-RS is acquired according to first parameters of N CORESETs having the lowest index and closest to the PDSCH/AP-CSI-RS. At this time, if transmission modes of the N CORESETs are different, and a transmission mode of the PDSCH/AP-CSI-RS can only be one, the transmission mode of the PDSCH/AP-CSI-RS is determined according to a transmission mode of one CORESET among the N CORESETs. For example, the transmission mode of the PDSCH/AP-CSI-RS is determined according to a transmission mode of a CORESET having the lowest CORESET among the N CORESETs. Alternatively, the transmission mode of the PDSCH/AP-CSI-RS is determined according to the transmission modes of the N CORESETs together.

In scene three-3, the first parameter of the PDSCH/AP-CSI-RS is acquired according to more than one TCI state. The more than one TCI state belongs to one TCI state mapping table, or the more than one TCI state belongs to different TCI state mapping tables. Different TCI state mapping tables correspond to PDSCHs in one frequency domain bandwidth, and different TCI state mapping tables correspond to different CORESET groups. For example, the more than one TCI state includes one of: multiple TCI states having the lowest TCI state index and activated by a MAC-CE; a TCI state corresponding to one or more codepoints having the lowest codepoint in a TCI state mapping table activated by a MAC-CE; or a TCI state, in a TCI state mapping table activated by a MAC-CE, corresponding to one or more codepoints, in a codepoint set where corresponding TCI states satisfy a predetermined characteristic, having the lowest index. codepoints of which corresponding TCI states satisfy the predetermined characteristic include one of: a codepoint whose number of corresponding TCI states is greater than a predetermined value; or a codepoint of which the corresponding TCI state includes a predetermined TCI state.

For scene three-4, the first parameter of the first downlink element PDSCH/AP-CSI-RS having the scheduling interval less than the first predetermined threshold is acquired according to more than one second downlink element. For example, in a case where multiple second downlink elements having an intersection with a time domain of the first downlink element PDSCH/AP-CSI-RS exist, a quasi co-location reference signal of the first downlink element PDSCH/AP-CSI-RS is acquired according to second parameters of the more than one second downlink element. Optionally, an intersection of time domain resources occupied by the more than one second downlink element is non-empty. As shown in FIG. 13 to FIG. 14, the first parameter of CSI-RS1 is acquired according to CSI-RS2 together with PDSCH1. For example, a TCI state having an index of 0 of CSI-RS1 is acquired according to a TCI state of CSI-RS2, and a TCI state having an index of 1 of CSI-RS1 is acquired according to a TCI state of PDSCH1. Optionally, CSI-RS2 and PDSCH1 are required to belong to the same group, or CSI-RS2 and PDSCH1 are required to belong to different groups, respectively. Whether to acquire the first parameter of the first downlink element according to second parameters of second downlink elements in the same group or to acquire the first parameter of the first downlink element according to second parameters of second downlink elements in different groups may be determined according to signaling information or a predetermined rule.

If solution 3 is used, in scene three-1, the number M of second parameters of the CORESET having the lowest CORESET index is one, or in scene three-2, the number M of second parameters of the CORESET where the PDCCH is located is one and the number N of quasi co-location parameters of the PDSCH/AP-CSI-RS is two, at this time, the quasi co-location parameter having an index of 0 of the PDSCH/AP-CSI-RS is determined according to a quasi co-location parameter of the preceding CORESET (or the CORESET where the PDCCH scheduling the PDSCH/AP-CSI-RS is located) having the lowest COERSET-ID. The quasi co-location parameter having an index of 1 of the PDSCH/AP-CSI-RS is acquired according to a third parameter, where the third parameter includes a parameter configured by RRC signaling or MAC-CE signaling. For example, the third parameter is a proprietary parameter, such as a parameter specially configured for remaining (N–M) first parameters of the PDSCH/AP-CSI-RS in scene three-1 or scene three-2. Alternatively, a corresponding relationship exists between the third parameter and the CORESET, that is, if M first parameters among N first parameters of the PDSCH/AP-CSI-RS are acquired according to a second parameter of one CORESET, the (N–M) first parameters are determined according to a third parameter corresponding to the one CORESET. A second parameter of a CORESET is a transmission parameter of the CORESET, and the third parameter is not a parameter required for the transmission of the CORESET; for example, a quasi co-location relationship exists between the second parameter and a DMRS of the CORESET, but no quasi co-location relationship exists between the third parameter and the CORESET. Alternatively, the third parameter is a parameter activated by a MAC-CE. For example, the third parameter is a predetermined item TCI state corresponding to a predetermined item codepoint in a TCI state mapping table activated by the MAC-CE. The predetermined item TCI state is acquired according to a predetermined TCI state among multiple TCI states included in the predetermined item codepoint; for example, the predetermined item TCI state is acquired according to the second TCI state among the multiple TCI states included in the predetermined item codepoint. The predetermined codepoint includes one of codepoints described below.

The predetermined item codepoint may include A: the lowest codepoint, that is, the codepoint whose value is 0. For example, for codepoint '00' in Table 1, another first parameter of the PDSCH/AP-CSI-RS is acquired according to the second TCI state corresponding to codepoint '00', that is, according to TCI state 2.

The predetermined item codepoint may include B: the lowest codepoint among codepoints satisfying a predetermined characteristic in the TCI state mapping table. The predetermined characteristic includes a codepoint including one second parameter of the second type element among codepoints. For example, if the TCI state of the preceding CORESET (including the CORESET having the lowest CORESET-ID in scene three-1 or the CORESET where the PDCCH scheduling the PDSCH/AP-CSI-RS is located in scene three-2) is TCI state 1, that is, the second parameter is TCI state 1, codepoints including TCI state 1 are found first from the TCI state mapping table; as shown in Table 1, codepoint '10' and codepoint '11' exist, and then the lowest, that is, codepoint '10', of codepoint '10' and codepoint '11' is selected.

The predetermined item codepoint may include C: the lowest codepoint among codepoints satisfying a predetermined characteristic in the TCI state mapping table. The predetermined characteristic includes that the number of TCI states included in a codepoint satisfies the predetermined characteristic. For example, if the number of TCI states is greater than 1, codepoints whose number of included TCI states is greater than 1 are found first in the TCI state mapping table; as shown in Table 1, codepoint '00', codepoint '10', and codepoint '11' exist, and then the lowest, that is, codepoint '00', among codepoint '00', codepoint '10', and codepoint '11' is selected.

Optionally, if the predetermined item codepoint does not include the predetermined item TCI state at this time, for example, if the number of TCI states corresponding to the preceding codepoint '00' or codepoint '10' is 1, a fourth parameter part corresponding to the (N−M) first parameters of the PDSCH/AP-CSI-RS is not sent. For example, N first parameters correspond to N time domain resource groups, and last (N−M) time domain resource groups of the PDSCH/AP-CSI-RS are not sent. Alternatively, the (N−M) first parameters of the PDSCH/AP-CSI-RS are among M second parameters. Alternatively, fourth parameters corresponding to N first parameters are divided into M fourth parameters, and a first parameter corresponding to each fourth parameter is separately acquired according to the M second parameters. For example, N first parameters correspond to N time domain resource groups, and at this time, the N time domain resource groups are divided into M time domain resource groups.

If solution 5 is used, in scene three-4, as shown in FIG. 13 to FIG. 14, the number of TCI states of CSI-RS1 is less than or equal to the minimum value of the number of TCI states in CSI-RS2 and the number of TCI states in PDSCH1. Optionally, the TCI state of CSI-RS1 is acquired according to the TCI state of the downlink element of CSI-RS2 and PDSCH1 whose number of TCI states is the smallest. For example, the number of TCI states of CSI-RS2 is 1, the number of TCI states of PDSCH1 is 2, and then the TCI state of CSI-RS1 is acquired according to the TCI state of CSI-RS2.

If solution 6 is used, in scene three-4, as shown in FIG. 13 to FIG. 14, the number of TCI states of CSI-RS1 is less than or equal to the maximum value of the number of TCI states in CSI-RS2 and the number of TCI states in PDSCH1. Optionally, the TCI state of CSI-RS1 is acquired according to the TCI state of the downlink element of CSI-RS2 and PDSCH1 whose number of TCI states is the largest. For example, the number of TCI states of CSI-RS2 is 1, the number of TCI states of PDSCH1 is 2, and then the TCI state of CSI-RS1 is acquired according to the TCI state of PDSCH1.

If solution 7 is used, for example, N=3, M=2, N first parameters correspond to N time domain resource groups of the PDSCH/AP-CSI-RS, and M second parameters correspond to M frequency domain resource groups of the second type element, a first parameter of a time domain resource group having an index of j is acquired according to a second parameter of a frequency domain resource group having an index of j, where j=0 or 1, and a first parameter of the last (N−M) time domain resource groups, that is, the last one time domain group, is acquired according to a second parameter having the largest index (or the smallest index) among the M second parameters.

If solution 8 is used, for example, N=3, M=2, N first parameters correspond to N time domain resource groups of the PDSCH/AP-CSI-RS, and M second parameters correspond to M frequency domain resource groups of the second type element, then the N time domain resource groups may be divided into M time domain resource groups, and a first parameter of a time domain resource group having an index of j is acquired according to a second parameter of a frequency domain resource group having an index of j, where j=0 or 1.

If solution 9 is used, when N is less than or equal to M, the first parameter of the first type element is acquired according to the second parameter of the second type element; when N is greater than M, the first parameter of the first type element is acquired according to the third parameter of the third type element. The third type element is different from the preceding second type element. In scene three-1, the third type element does not include the CORESET having the lowest CORESET-ID, in scene three-2, the third type element does not include the CORESET where the PDCCH scheduling the PDSCH/AP-CSI-RS is located, in scene three-3, the third type element does not include the preceding predetermined item TCI state, and in scene three-4, the third type element does not include the preceding second downlink element.

Optionally, in a case where the first parameter includes a first transmission mode of a first downlink element and the second parameter includes a second transmission mode of a second downlink element, acquiring the second parameter of the second type element according to the first parameter of the first type element includes the following. The second transmission mode of the second downlink element is acquired according to the first transmission mode of the first downlink element. For example, in scene three-1, a transmission mode of the PDSCH/AP-CSI-RS having the scheduling interval less than the predetermined threshold is acquired according to a transmission mode of the CORESET having the lowest CORESET-ID. Mapping relationships between N first parameters of the preceding PDSCH/AP-CSI-RS having the scheduling interval less than the predetermined threshold and fourth parameters of the PDSCH/AP-CSI-RS are determined according to mapping relationships between M second parameters of the preceding COREST having the lowest CORESET-ID and fourth parameters of the COREST; or the number of fourth parameters of the preceding PDSCH/AP-CSI-RS having the scheduling interval less than the predetermined threshold is determined according to the number of fourth parameters of the COREST having the lowest CORESET-ID; or the number N of first parameters of the preceding PDSCH/AP-CSI-RS having the scheduling interval less than the predetermined threshold is determined according to the number M of second parameters of the COREST having the lowest CORESET-ID.

According to the parameter information determination method provided in the embodiments of the present application, the first parameter of the first type element is acquired according to the second parameter of the second type element, so that the first parameter and the second parameter share one piece of notifying signaling or one determination method, and the first parameter is updated after the second parameter is updated. The element includes at least one of: a channel, a signal, or one item in a mapping table. In a case where the first parameter and the second parameter include beam information, rapid beam switching can be achieved. Moreover, the present application considers how to acquire beam information of the first type element in a multibeam scene. Through the method of the present application, the multiple beam transmission is supported while the signaling overhead and the beam switching delay are reduced, so that the robustness or the spectral efficiency of links is improved.

Figure 16:
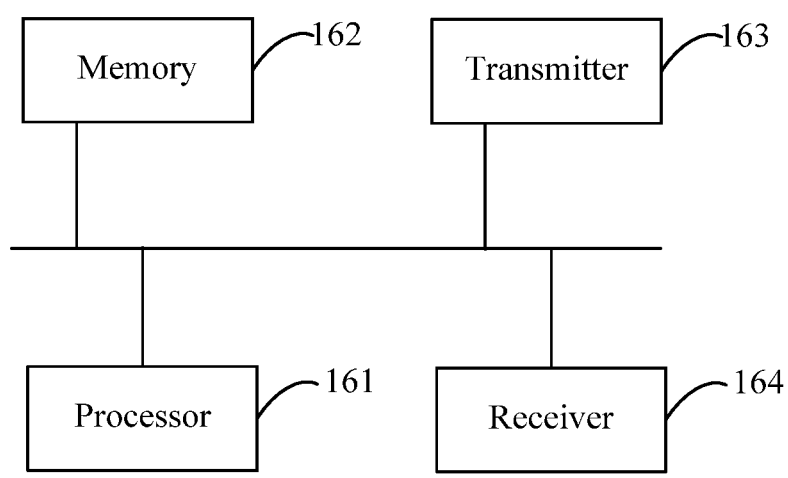
FIG. 16 is a structural diagram of a communication node according to an embodiment.

FIG. 16 is a structural diagram of a communication node according to an embodiment. As shown in FIG. 16, the communication node includes a processor 161, a memory 162, a transmitter 163 and a receiver 164. One or more processors 161 may be provided in the communication node, and one processor 161 is used as an example in FIG. 16. The processor 161, the memory 162, the transmitter 163 and the receiver 154 in the communication node may be connected through a bus or in other manners. In FIG. 16, the connection through the bus is used as an example.

As a computer-readable storage medium, the memory 162 may be configured to store software programs and computer-executable programs and modules. The processor 161 runs the software programs, the instructions and the modules that are stored in the memory 162 to complete at least one of the function applications and data processing of the communication node, that is, to implement the preceding parameter information determination method.

The memory 162 may mainly include a program storage region and a data storage region, where the program storage region may store an operating system and an application program required by at least one function while the data storage region may store data created depending on use of the communication node. Additionally, the memory 162 may include a high-speed random-access memory and may further include a non-volatile memory, for example, at least one magnetic disk memory and flash memory or other non-volatile solid-state memories.

The transmitter 163 is a combination of modules or devices capable of transmitting radio frequency signals into space and includes, for example, a combination of a radio frequency transmitter, an antenna and another device. The receiver 164 is a combination of modules or devices capable of receiving radio frequency signals from space and includes, for example, a combination of a radio frequency receiver, an antenna and other devices.

The embodiments of the present application further provide a storage medium including computer-executable instructions. The computer-executable instructions, when executed by a computer processor, are configured to execute a parameter information determination method including the following. A first parameter of a first type element is acquired according to a second parameter of a second type element, where the number of first parameters of the first type element is N, the number of second parameters of the second type element is M, and M and N are each a positive integer greater than or equal to 1. The element includes one of: a channel, a signal, or one item in a mapping table.

The term user terminal encompasses any appropriate type of wireless user device, such as a mobile phone, a portable data processing apparatus, a portable web browser or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random-access memory (RAM) and an optical storage apparatus and system (a digital video disc (DVD) or a compact disc (CD)). Computer-readable media may include non-transitory storage media. The data processor may be of any type suitable for a local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A parameter information determination method, comprising:
acquiring a first parameter of a first signal according to a second parameter of a second signal, wherein a number of first parameters of the first signal is N, a number of second parameters of the second signal is M, M and N are each a positive integer greater than or equal to 1, and in a case where N is less than or equal to M, N first parameters of the first signal are acquired according to first N second parameters among M second parameters of the second signal;
wherein acquiring the first parameter of the first signal according to the second parameter of the second signal comprises at least one of:
acquiring a first parameter of an uplink signal according to a second parameter of a downlink signal, wherein the first parameter of the uplink signal comprises at least one of the following parameters: a spatial parameter, or a power parameter, and the second parameter of the downlink signal comprises a quasi co-location parameter;
acquiring a first parameter of a first uplink signal according to a second parameter of a second uplink signal, wherein the first parameter of the first uplink signal and the second parameter of the second uplink signal comprises at least one of the following parameters: a spatial parameter, or a power parameter; or
acquiring a first parameter of a first downlink signal according to a second parameter of a second downlink signal, wherein the first parameter of the first downlink signal and the second parameter of the second downlink signal comprises a quasi co-location parameter; and
wherein the first parameter having an index of i of the first signal is acquired according to a second parameter having an index of i of the second signal, and an index of each second parameter among the M second parameters of the second signal in the M second parameters is acquired according to a sequencing order of the M second parameters in signaling notifying the M second parameters, wherein $i \in \{0, 1, \ldots, N-1\}$.

2. The method according to claim 1, wherein acquiring the first parameter of the first signal according to the second parameter of the second signal further comprises:
determining a second parameter, among the M second parameters of the second signal, corresponding to each first parameter of the N first parameters, wherein the each first parameter is acquired according to a second parameter having a corresponding relationship with the each first parameter.

3. The method according to claim 2, wherein an index of each second parameter among the M second parameters of the second signal in the M second parameters is acquired further according to one of the following pieces of information:

a fourth parameter of the second signal corresponding to the each second parameter;
group information of the second signal.

4. The method according to claim 1, wherein acquiring the first parameter of the first signal according to the second parameter of the second signal further comprises:
acquiring the first parameter of the first signal according to second parameters of more than one second signal;
wherein the number N of first parameters of one first signal is greater than the number M of second parameters of one second signal; and
wherein the more than one second signal satisfies one of: the more than one second signal belonging to a same second signal group.

5. The method according to claim 4, wherein each first parameter among N first parameters of the first signal is acquired according to a second parameter having a corresponding relationship with the each first parameter, wherein corresponding relationships between the N first parameters of the first signal and second parameters of a plurality of second signals are determined according to at least one of the following pieces of information: an index of the second signal, an index of a second signal group, a number of second parameters of one second signal, or an index of each second parameter among M second parameters of one second signal in the M second parameters.

6. The method according to claim 1, wherein acquiring the first parameter of the first signal according to the second parameter of the second signal further comprises one of:
in a case where N is greater than M, acquiring M first parameters of a first type element according to M second parameters of a second type element, and acquiring remaining (N—M) first parameters according to a third parameter, wherein the third parameter is acquired according to signaling information or a predetermined rule;
in a case where N is greater than M, acquiring first M first parameters of the first signal according to M second parameters of the second signal, and acquiring remaining last (N—M) first parameters of the first signal according to a predetermined item second parameter among the M second parameters of the second signal; or
in a case where N is less than or equal to M, acquiring the first parameter of the first signal according to the second parameter of the second signal, and in a case where N is greater than M, acquiring the first parameter of the first signal according to a third parameter of a third signal.

7. The method according to claim 1, wherein
acquiring the first parameter of the uplink signal according to the second parameter of the downlink signal comprises:
acquiring the first parameter of the uplink signal according to a second parameter of a control resource set (CORESET) having a lowest CORESET identity (CORESET-ID) in a downlink bandwidth.

8. The method according to claim 1, wherein
in a case where acquiring the first parameter of the first uplink signal according to the second parameter of the second uplink signal,
the second uplink signal comprises a PUCCH having a lowest PUCCH resource index in a frequency domain bandwidth where the first uplink signal is located; and
the first uplink signal comprises one of: a PUSCH scheduled by DCI 0_0, wherein an uplink frequency domain bandwidth where the PUSCH is located is configured with a PUCCH.

9. The method according to claim 1, wherein
acquiring the first parameter of the first downlink signal according to the second parameter of the second downlink signal comprises at least one of:
acquiring a first parameter of a PDSCH or aperiodic-channel state indication-reference signal (AP-CSI-RS) according to a second parameter of a CORESET having a lowest CORESET index and associated with a monitoring search space in a latest slot of the PDSCH or AP-CSI-RS having CORESETs, wherein a frequency domain bandwidth where the PDSCH or AP-CSI-RS is located is configured with at least one quasi co-location reference signal associated with a spatial reception parameter, and a time interval between a PDCCH scheduling the PDSCH or AP-CSI-RS and the PDSCH or AP-CSI-RS is less than a predetermined threshold;
acquiring a first parameter of a PDSCH or AP-CSI-RS according to a second parameter of a CORESET where a PDCCH scheduling the PDSCH or AP-CSI-RS is located, wherein the PDSCH or AP-CSI-RS satisfies: the PDCCH scheduling the PDSCH/AP-CSI-RS does not comprise indication information of a quasi co-location parameter of the PDSCH or AP-CSI-RS, a frequency domain bandwidth where the PDSCH or AP-CSI-RS is located is configured with at least one quasi co-location reference signal associated with a spatial reception parameter, and a time interval between the PDCCH scheduling PDSCH or AP-CSI-RS and the PDSCH or AP-CSI-RS is greater than or equal to a predetermined threshold;
acquiring a first parameter of a PDSCH or AP-CSI-RS according to a TCI state with a predetermined index in a TCI state mapping table in a frequency domain bandwidth where the PDSCH or AP-CSI-RS is located, wherein the TCI state with a predetermined index is the second parameter and the PDSCH or AP-CSI-RS satisfies: a PDCCH scheduling the PDSCH or AP-CSI-RS and the PDSCH or AP-CSI-RS are in different frequency domain bandwidths or a largest number of TCI states corresponding to one item codepoint in the TCI state mapping table activated for the PDSCH or AP-CSI-RS in the frequency domain bandwidth where the PDSCH or AP-CSI-RS is located is 2, and a frequency domain bandwidth where the PDSCH or AP-CSI-RS is located is configured with at least one quasi co-location reference signal associated with a spatial reception parameter and a time interval between a PDCCH scheduling the PDSCH or AP-CSI-RS and the PDSCH or AP-CSI-RS is less than a predetermined threshold; or
in a case where time domain resources of the first downlink signal having a scheduling interval less than a first predetermined threshold and time domain resources of the second downlink signal overlap, the first parameter of the first downlink signal is acquired according to the second parameter of the second downlink signal, wherein the second downlink signal comprises at least one of: a periodic downlink signal, a semi-persistent downlink signal, an aperiodic downlink signal having a scheduling interval greater than or equal to a second predetermined threshold, a CORESET, or a synchronization signal.

10. The method according to claim 1, wherein acquiring the first parameter of the first signal according to the second parameter of the second signal further comprises at least one of:
  determining a first transmission mode of the first signal according to a second transmission mode of the second signal;
  determining a value of N according to a value of M;
  determining a number of fourth parameters of the first signal according to a number of fourth parameters of the second signal, wherein the fourth parameter comprises one of: a DMRS port group, a time domain resource group, a frequency domain resource group, or one transmission occasion of a signal; or
  determining a number of repeated transmission times of the first signal according to a number of repeated transmission times of the second signal;
  wherein determining the first transmission mode of the first signal according to the second transmission mode of the second signal comprises one of:
  the first transmission mode being the same as the second transmission mode;
  obtaining a transmission mode set to which the first transmission mode belongs according to the second transmission mode; or
  a type of a fourth parameter corresponding to a first parameter in the first transmission mode being the same as a type of a fourth parameter corresponding to a second parameter in the second transmission mode;
  wherein the second transmission mode of the second signal comprises mapping relationships between M second parameters of the second signal and X fourth parameters of the second signal, wherein X is a positive integer, or the second transmission mode comprises a repeated transmission mode of the second signal; or
  the first transmission mode of the first signal comprises mapping relationships between N first parameters of the first signal and Y fourth parameters of the first signal, wherein Y is a positive integer, or the first transmission mode comprises a repeated transmission mode of the first signal.

11. A communication node, comprising a processor and a memory, wherein the processor is configured to execute program instructions stored in the memory to perform:
  acquiring a first parameter of a first signal according to a second parameter of a second signal, wherein a number of first parameters of the first signal is N, a number of second parameters of the second signal is M, M and N are each a positive integer greater than or equal to 1, and in a case where N is less than or equal to M, N first parameters of the first signal are acquired according to first N second parameters among M second parameters of the second signal;
  wherein acquiring the first parameter of the first signal according to the second parameter of the second signal comprises at least one of:
  acquiring a first parameter of an uplink signal according to a second parameter of a downlink signal, wherein the first parameter of the uplink signal comprises at least one of the following parameters: a spatial parameter, or a power parameter, and the second parameter of the downlink signal comprises a quasi co-location parameter;
  acquiring a first parameter of a first uplink signal according to a second parameter of a second uplink signal, wherein the first parameter of the first uplink signal and the second parameter of the second uplink signal comprises at least one of the following parameters: a spatial parameter, or a power parameter; or
  acquiring a first parameter of a first downlink signal according to a second parameter of a second downlink signal, wherein the first parameter of the first downlink signal and the second parameter of the second downlink signal comprises a quasi co-location parameter; and
  wherein the first parameter having an index of i of the first signal is acquired according to a second parameter having an index of i of the second signal, and an index of each second parameter among the M second parameters of the second signal in the M second parameters is acquired according to a sequencing order of the M second parameters in signaling notifying the M second parameters, wherein $i \in \{0,1, \ldots, N-1\}$.

12. The communication node according to claim 11, wherein acquiring the first parameter of the first signal according to the second parameter of the second signal further comprises:
  determining a second parameter, among the M second parameters of the second signal, corresponding to each first parameter of the N first parameters, wherein the each first parameter is acquired according to a second parameter having a corresponding relationship with the each first parameter.

13. The communication node according to claim 12, wherein an index of each second parameter among the M second parameters of the second signal in the M second parameters is acquired further according to one of the following pieces of information:
  a fourth parameter of the second signal corresponding to the each second parameter;
  group information of the second signal.

14. The communication node according to claim 11, wherein acquiring the first parameter of the first signal according to the second parameter of the second signal further comprises:
  acquiring the first parameter of the first signal according to second parameters of more than one second signal;
  wherein the number N of first parameters of one first signal is greater than the number M of second parameters of one second signal; and
  wherein the more than one second signal satisfies one of:
  the more than one second signal belonging to a same second-element signal group.

15. The communication node according to claim 14, wherein each first parameter among N first parameters of the first signal is acquired according to a second parameter having a corresponding relationship with the each first parameter, wherein corresponding relationships between the N first parameters of the first signal and second parameters of a plurality of second signals are determined according to at least one of the following pieces of information: an index of the second signal, an index of a second signal group, a number of second parameters of one second signal, or an index of each second parameter among M second parameters of one second signal in the M second parameters.

16. The communication node according to claim 11, wherein acquiring the first parameter of the first signal according to the second parameter of the second signal further comprises one of:
  in a case where N is greater than M, acquiring M first parameters of the first signal according to M second parameters of the second signal, and acquiring remaining (N−M) first parameters according to a third parameter, wherein the third parameter is acquired according to signaling information or a predetermined rule;

in a case where N is greater than M, acquiring first M first parameters of the first signal according to M second parameters of the second type element signal, and acquiring remaining last (N−M) first parameters of the first signal according to a predetermined item second parameter among the M second parameters of the second signal; or in a case where N is less than or equal to M, acquiring the first parameter of the first signal according to the second parameter of the second signal, and in a case where N is greater than M, acquiring the first parameter of the first signal according to a third parameter of a third signal.

17. The communication node according to claim 11, wherein acquiring the first parameter of the uplink signal according to the second parameter of the downlink signal comprises at least one of:

acquiring the first parameter of the uplink signal according to a second parameter of a control resource set (CORESET) having a lowest CORESET identity (CORESET-ID) in a downlink bandwidth;

acquiring the first parameter of the uplink signal according to a predetermined transmission configuration indication (TCI) state, wherein the predetermined TCI state comprises at least one of: one or more TCI states having the lowest TCI state index in a TCI state set configured or activated by a physical downlink shared channel (PDSCH) in a downlink frequency domain bandwidth; or a TCI state corresponding to one or more codepoints, wherein a codepoint corresponds to one or more TCI states, M is equal to a number of TCI states corresponding to the codepoint, the codepoint is in a TCI state mapping table, the TCI state mapping table is a TCI state mapping table activated by a MAC-CE for a PDSCH of a downlink frequency domain bandwidth, and the TCI state mapping table shows mapping relationships between codepoints of a TCI indicator field in downlink control information (DCI) and TCI states; or acquiring a spatial parameter corresponding to one item in a resource indicator (SRI) mapping table of a physical uplink shared channel (PUSCH) according to a TCI state corresponding to one item in a TCI state mapping table of a PDSCH.

18. The communication node according to claim 11, wherein in a case where acquiring the first parameter of the first uplink signal according to the second parameter of the second uplink signal;

wherein the second uplink signal comprises a PUCCH having a lowest PUCCH resource index in a frequency domain bandwidth where the first uplink signal is located; and the first uplink signal comprises one of: a PUSCH scheduled by DCI 0_0, wherein an uplink frequency domain bandwidth where the PUSCH is located is configured with a PUCCH.

19. The communication node according to claim 11, wherein acquiring the first parameter of the first downlink signal according to the second parameter of the second downlink signal comprises at least one of:

acquiring a first parameter of a PDSCH or aperiodic-channel state indication-reference signal (AP-CSI-RS) according to a second parameter of a CORESET having a lowest CORESET index and associated with a monitoring search space in a latest slot of the PDSCH or AP-CSI-RS having CORESETs, wherein a frequency domain bandwidth where the PDSCH or AP-CSI-RS is located is configured with at least one quasi co-location reference signal associated with a spatial reception parameter, and a time interval between a PDCCH scheduling the PDSCH or AP-CSI-RS and the PDSCH or AP-CSI-RS is less than a predetermined threshold;

acquiring a first parameter of a PDSCH or AP-CSI-RS according to a second parameter of a CORESET where a PDCCH scheduling the PDSCH or AP-CSI-RS is located, wherein the PDSCH or AP-CSI-RS satisfies: the PDCCH scheduling the PDSCH/AP-CSI-RS does not comprise indication information of a quasi co-location parameter of the PDSCH or AP-CSI-RS, a frequency domain bandwidth where the PDSCH or AP-CSI-RS is located is configured with at least one quasi co-location reference signal associated with a spatial reception parameter, and a time interval between the PDCCH scheduling PDSCH or AP-CSI-RS and the PDSCH or AP-CSI-RS is greater than or equal to a predetermined threshold;

acquiring a first parameter of a PDSCH or AP-CSI-RS according to a TCI state with a predetermined index in a TCI state mapping table in a frequency domain bandwidth where the PDSCH or AP-CSI-RS is located, wherein the TCI state with a predetermined index is the second parameter and the PDSCH or AP-CSI-RS satisfies: a PDCCH scheduling the PDSCH or AP-CSI-RS and the PDSCH or AP-CSI-RS are in different frequency domain bandwidths or a largest number of TCI states corresponding to one item codepoint in the TCI state mapping table activated for the PDSCH or AP-CSI-RS in the frequency domain bandwidth where the PDSCH or AP-CSI-RS is located is 2, and a frequency domain bandwidth where the PDSCH or AP-CSI-RS is located is configured with at least one quasi co-location reference signal associated with a spatial reception parameter and a time interval between a PDCCH scheduling the PDSCH or AP-CSI-RS and the PDSCH or AP-CSI-RS is less than a predetermined threshold; or in a case where time domain resources of the first downlink signal having a scheduling interval less than a first predetermined threshold and time domain resources of the second downlink signal overlap, the first parameter of the first downlink signal is acquired according to the second parameter of the second downlink signal, wherein the second downlink signal comprises at least one of: a periodic downlink signal, a semi-persistent downlink signal, an aperiodic downlink signal having a scheduling interval greater than or equal to a second predetermined threshold, a CORESET, or a synchronization signal.

20. A non-transitory computer-readable storage medium storing a computer program which, when performed by a processor, cause the processor to perform:

acquiring a first parameter of a first signal according to a second parameter of a second signal, wherein a number of first parameters of the first signal is N, a number of second parameters of the second signal is M, M and N are each a positive integer greater than or equal to 1, and in a case where N is less than or equal to M, N first parameters of the first signal are acquired according to first N second parameters among M second parameters of the second signal;

wherein the first signal comprises one of: a channel, a signal, or one item in a mapping table and the second signal comprises one of: a channel, a signal, or one item in a mapping table;
wherein acquiring the first parameter of the first signal according to the second parameter of the second signal comprises at least one of:
acquiring a first parameter of an uplink signal according to a second parameter of a downlink signal, wherein the first parameter of the uplink signal comprises at least one of the following parameters: a spatial parameter, or a power parameter, and the second parameter of the downlink signal comprises a quasi co-location parameter;
acquiring a first parameter of a first uplink signal according to a second parameter of a second uplink signal, wherein the first parameter of the first uplink signal and the second parameter of the second uplink signal comprises at least one of the following parameters: a spatial parameter, or a power parameter; or
acquiring a first parameter of a first downlink signal according to a second parameter of a second downlink signal, wherein the first parameter of the first downlink signal and the second parameter of the second downlink signal comprises a quasi co-location parameter; and
wherein the first parameter having an index of i of the first signal is acquired according to a second parameter having an index of i of the second signal, and an index of each second parameter among the M second parameters of the second signal in the M second parameters is acquired according to a sequencing order of the M second parameters in signaling notifying the M second parameters, wherein $i \in \{0, 1, \ldots, N-1\}$.

* * * * *